(12) United States Patent
Diekfuss et al.

(10) Patent No.: US 12,140,464 B2
(45) Date of Patent: *Nov. 12, 2024

(54) PERMEABLE PAVEMENT MONITORING SYSTEM

(71) Applicant: P4 Infrastructure, Inc., Milwaukee, WI (US)

(72) Inventors: Joseph A. Diekfuss, Waukesha, WI (US); Nicholas J. Hornyak, Pewaukee, WI (US); Christopher M. Foley, Milwaukee, WI (US)

(73) Assignee: P4 Infrastructure, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,787

(22) Filed: Apr. 17, 2023

(65) Prior Publication Data
US 2023/0251124 A1 Aug. 10, 2023

Related U.S. Application Data

(63) Continuation of application No. 16/676,296, filed on Nov. 6, 2019, now Pat. No. 11,656,116.
(Continued)

(51) Int. Cl.
*E01C 11/22* (2006.01)
*E01C 3/00* (2006.01)
(Continued)

(52) U.S. Cl.
CPC ............ *G01F 23/804* (2022.01); *E01C 3/003* (2013.01); *E01C 3/06* (2013.01); *E01C 11/226* (2013.01); *E01C 2201/20* (2013.01)

(58) Field of Classification Search
CPC .......... G01F 23/804; E01C 3/003; E01C 3/06; E01C 11/226; E01C 2201/20
(Continued)

(56) References Cited

U.S. PATENT DOCUMENTS

| 5,342,144 A | 8/1994 | McCarthy |
| 8,388,260 B2 | 3/2013 | Chen et al. |

(Continued)

OTHER PUBLICATIONS

Kazemi, H., Rockaway, T.D., Rivard, J., Abdollahian, S. (2017), "Assessment of Surface Infiltration Performance and Maintenance of Two permeable pavement Systems in Kentucky", Journal of Sustainable Water in the Built Environment, Jun. 30, 2017, American Society of Civil Engineers, Reston, VA.
(Continued)

*Primary Examiner* — Raymond W Addie
(74) *Attorney, Agent, or Firm* — Reinhart Boerner Van Deuren s.c.

(57) ABSTRACT

Various embodiments of a system for monitoring drainage of a permeable pavement system are provided as well as various exemplary installation scenarios. In particular, embodiments of a permeable (or pervious) pavement management platform are disclosed herein. In embodiments, the pavement management platform provides a service that allows the user to determine vacuum maintenance needs for permeable (or pervious) pavement systems. Advantages of the platform include: subscription-based asset management platform as a service (PaaS), customized off-the-shelf water-level sensors, off-the-shelf tipping-bucket rain gauge, observation well installation consistent with industry standards, can be implemented in residential, commercial, municipal, county, and state systems, lithium-ion battery powered sensor, LoRA sensor to hub data transmission network, cellular data transmission from hub, electrical power for cellular data transmission hub (can be solar panel powered), real-time dashboarding of surface runoff storage, real-time dashboarding of ground water recharge rate, and permeability (clogging) threshold alerts, among others.

20 Claims, 16 Drawing Sheets

Related U.S. Application Data

(60) Provisional application No. 62/757,027, filed on Nov. 7, 2018.

(51) Int. Cl.
  *E01C 3/06* (2006.01)
  *G01F 23/80* (2022.01)

(58) Field of Classification Search
  USPC .................................. 404/2, 4, 17, 31–36, 72
  See application file for complete search history.

(56) References Cited

U.S. PATENT DOCUMENTS

| | | |
|---|---|---|
| 2017/0294101 A1 | 10/2017 | Stettler et al. |
| 2020/0070220 A1 | 3/2020 | Heinrichs |

OTHER PUBLICATIONS

Chopra, M., Hardin, M., Gogo-Abite, I, Lassen, K. (2016). *Pavedrain Permeable Pavement*, Final Report, Stormwater Management Academy, University of Central Florida, Orlando, FL.

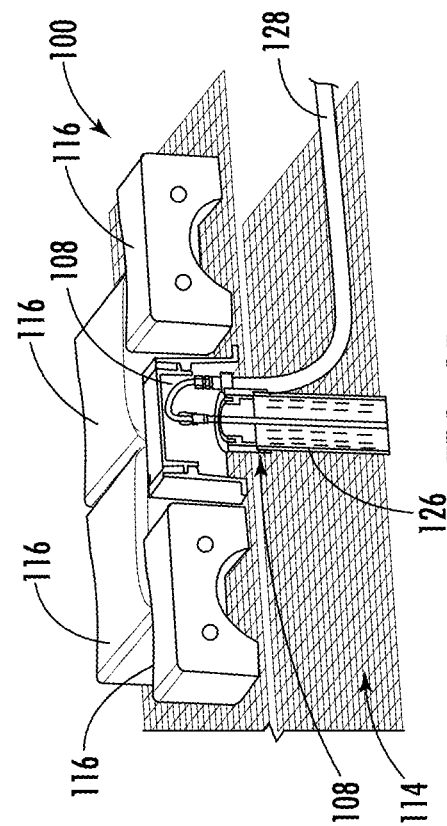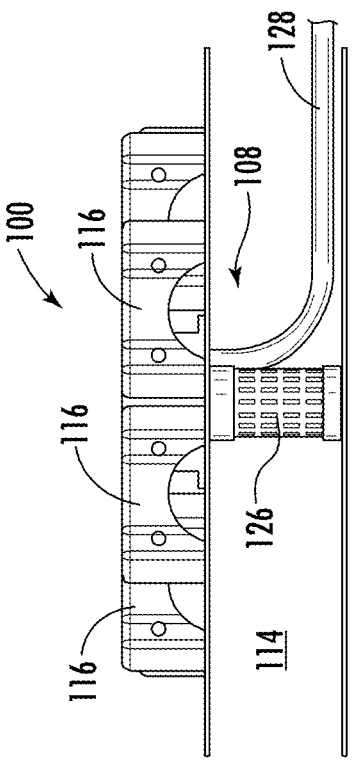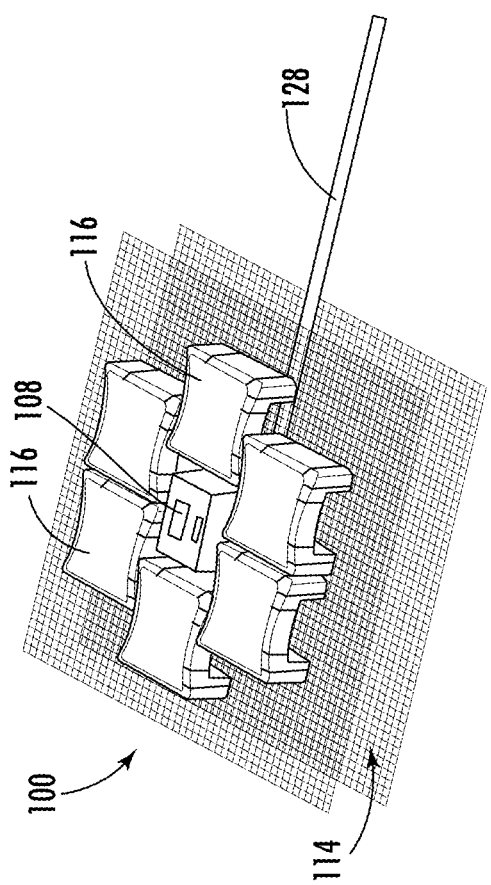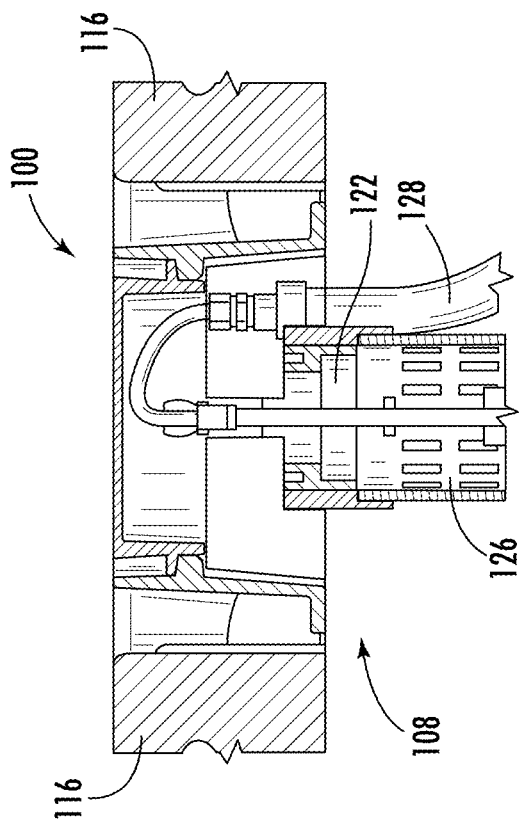

PERMEABLE PAVEMENT MONITORING SYSTEM

CROSS-REFERENCE TO RELATED PATENT APPLICATIONS

The present application is a continuation of U.S. application Ser. No. 16/676,296, filed Nov. 6, 2019, which claims the benefit of and priority to 62/757,027 filed on Nov. 11, 2018, each of which is incorporated herein by reference in its entirety.

BACKGROUND OF THE INVENTION

The present invention relates generally to the field of infrastructure monitoring. The present invention relates specifically to a permeable pavement sensor system that allows for monitoring of stormwater drainage.

Management of stormwater runoff is a significant issue in land development associated with private, industrial, municipal, county, and state infrastructure. Permeable pavement surfaces are a valuable tool in managing stormwater runoff associated with new land development and changes in existing land use. However, permeable pavement surfaces are subjected to debris and sediment carried from stormwater runoff, leaves from trees, rubbish from the public, and other sources that conspire to plug/clog the surface that was permeable at time of installation. The rate of, and location where, clogging and plugging occurs within the permeable surfaces is uncertain. As a result, permeable pavement surfaces require visual inspection to ensure that the surface is not clogged to such an extent that ponding or flooding of the surface will occur.

Owners of permeable pavement systems are forced to use experience (e.g. the surface has ponding today in several locations, or the surface has not shown ponding for several years) and visual inspection to assess the need for maintenance of the permeable surface to ensure rainfall flow from surface to subgrade. In the case of a private owner's two-acre parking lot, experience and visual inspection might not be too bad. In the case of a large commercial or institutional campus with acres of parking surface or large and widely distributed regions of permeable surfaces within municipalities, experience and visual inspection-based maintenance can be very costly.

Stormwater management and ground water recharge are at the essence of sustainability of civil infrastructure initiatives. However, there is precious little knowledge regarding the long-term efficacy of many novel infrastructure systems including permeable pavement surfaces. Greater use of permeable pavement systems in larger-scale stormwater management plans that include synergistic use of conveyance systems (e.g. storm sewer) and storage systems (e.g. retention systems, permeable surfaces with subgrade storage) cannot occur without effective management of both systems and a greater understanding of how each of these systems work. The ability for a permeable pavement system to store storm water and recharge groundwater is uncertain.

The progression of clogging throughout a permeable pavement surface needs to be done through visual inspection now. There is no mechanism for autonomously determining the extent of clogging over a permeable pavement surface and therefore, excessive visual maintenance schedules are followed. In other cases, no maintenance is conducted, or unplanned maintenance intervention is completed when surface clogging is extensive. The longer clogging is allowed to occur, the more difficult maintenance becomes and the more unreliable the efficacy of the maintenance conducted is.

There is a need for autonomous detection of clogging extent within permeable pavement systems to drive rational maintenance interventions and prevent flooding. Furthermore, this autonomous system needs to be capable of scaling to geographically located permeable pavement systems to connect to other systems within the stormwater infrastructure network (e.g. stormwater conveyance systems) and facilitate integration into the maintenance and planning of civil infrastructure systems.

The customer needs in this regard can be considered as both latent and active. The problem is latent in that those that own permeable pavement surfaces know they have maintenance to conduct, know that there is not a systematic way to define when maintenance needs to occur other than through visual inspection or evidence of ponding, and they will be conducting maintenance in the future at an unknown time interval. As the scale of permeable pavement implementations increases, maintenance will become a greater problem to owners.

The permeable pavement industry-suppliers have active need as permeable pavement systems are being associated with maintenance headaches. The efficacy of these system's ability to recharge groundwater-levels is in question. Neither owners nor the industry currently have a solution to these problems.

SUMMARY OF THE INVENTION

Various embodiments of a system for monitoring drainage of a permeable pavement system are provided as well as various exemplary installation scenarios.

One embodiment describes a system for monitoring water-levels generated by water flowing through an area of a permeable surface into a water drainage structure situated below the permeable surface. The system includes a first water-level sensor located at a first position in the water drainage structure to generate first water-level data representative of the water-level at the first position and a second water-level sensor located at a second position in the water drainage structure to generate second water-level data representative of the water-level at the second position. Data memory and a data processor are coupled to the first and second water-level sensors. The memory stores water-level data sampled and processed from the sensors at a plurality of times $t_0$ to $t_n$. A water-level change rate $r_1$ to $r_n$ associated with a first sensor is generated based upon first water-level data and stored in memory in reference to times $t_1$ to $t_n$. The system generates water-level change rates $rr_1$ to $rr_n$ associated with a second sensor and based upon water-level data that is stored in memory with reference to times $t_1$ to $t_n$. The system compares rates $r_1$ to $r_n$ to rates $rr_1$ to $rr_n$ for a select group of times $t_1$ to $t_n$ to generate comparison data $c_1$ to $c_n$. The system stores the comparison data in memory in reference to at least one of the first and second water-level change rates $rr_1$ or $rr_n$. The system then determines and stores the comparison data changes over time in reference to the at least one of the water-level change rates associated with the first and/or second sensor.

Another embodiment describes a paved system that includes a water drainage structure, a rigid permeable surface, several water-level sensors, memory and a data processor. The rigid permeable surface is supported above the drainage structure to permit water to flow from the surface into the structure. The water-level sensors are located at respective locations within the drainage structure and generate respective water-level data representative of the water-level at the respective locations. Memory and a data processor are coupled to the water-level sensors. The memory stores the water-level data from each of the water-level sensors in reference to times $t_0$ to $t_n$. The data processor generates and stores the water-level rate change data for each water-level sensor in reference to times $t_1$ to $t_n$. The processor compares water-level rate changes from all sensors from time $t_1$ to $t_n$ and identifies the water-level sensors which have relative water-level rate changes which slow relative to the water-level rate changes of the other of the sensors from time $t_1$ to $t_n$.

In another embodiment, a method for determining debris accumulation at various locations on a permeable surface supported above a drainage structure that is situated below the permeable surface, is described. The method includes sensing water-levels at various predetermined locations within the drainage structure for times $t_0$ to $t_n$ and determining the rate of water-level change at each location based upon the water-level change for the respective locations. The rate of water-level changes for each of the locations in reference to times $t_1$ to $t_n$ is stored, compared and used to determine locations at which the relative rate of water-level change is slowing in reference to the water-level change of the other sensors. From this data, the method determines a location of debris accumulation based upon the location(s) at which relative water-level change slows.

In some embodiments of a permeable (or pervious) pavement management platform, the pavement management platform provides a service that allows the user to determine vacuum maintenance needs for permeable (or pervious) pavement systems. Advantages of the platform include: subscription-based asset management platform as a service (PaaS), customized off-the-shelf water-level sensors (FPI Sensor Systems—Eagan, MN), off-the-shelf tipping-bucket rain gauge (Texas Electronics, Inc.—Texas), observation well installation consistent with industry standards, can be implemented in residential, commercial, municipal, county, and state systems, lithium-ion battery powered sensor, LoRA sensor to hub data transmission network, cellular data transmission from hub, electrical power for cellular data transmission hub (can be solar panel powered), real-time dashboarding of surface runoff storage, real-time dashboarding of ground water recharge rate, and permeability (clogging) threshold alerts (e.g. 25%, 50%), among others.

The owner of a permeable pavement system will be able to: determine the extent to which the permeable pavement is clogged from remote locations, remotely determine if vacuum maintenance is needed, avoid human inspection visits to determine clogging extent, have the evaluation of maintenance need independent of pavement system dimension and type (e.g. a large parking lot or long stretch of permeable shoulder will have significantly greater inspection and maintenance evaluation costs), demonstrate groundwater recharge rates, demonstrate surface runoff volume kept out of conveyance systems (e.g. storm sewer), remove the costs associated with human inspection of permeable pavement, conduct vacuum maintenance only when needed rather than regularized cycles, and more effectively manage financial resources by using vacuum-truck services rather than incurring capitalized equipment costs, annual equipment maintenance costs, annual fuel costs, and annual labor costs.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments. Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIGS. 3A-D depict additional views of permeable pavement water-level sensors, according to an exemplary embodiment;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Figure 1:
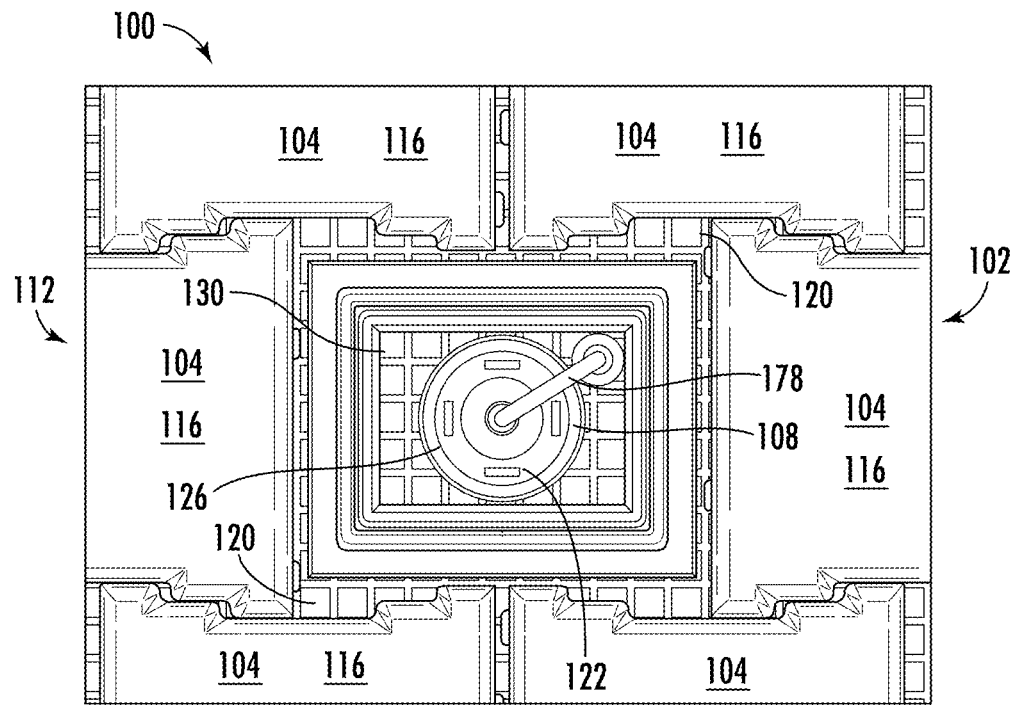
FIG. 1 depicts a top view of a permeable pavement water-level sensor, according to an exemplary embodiment.

FIG. 1 illustrates a permeable pavement application or system 100. An operator or user of system 100 desires to know where clogging is occurring. For example, the user of a plan area 102 with permeable pavement 104 considers vacuuming portions of a parking lot or traffic lane when clogged instead of the entire plan area 102, to reduce cost. However, vacuuming clogged plan areas 102, or a clog 106 utilizes high mobilization costs, for example, to send a truck to the location of the plan area 102, inspect the clog 106, and vacuum the clogged water and debris. A single float sensor 108 used to determine flooding in the low point, e.g., of a parking lot or immediately upstream of an inlet 110, senses and indicates the clog 106, but will not characterize how or where the clog 106 is occurring. The single sensor 108 only indicates that clogging has occurred, but fails to characterize how much or where the clogging occurred.

Up-gradient clogging has been recognized in permeable pavement 104 systems 100. See, e.g., Kazemi, H., Rockaway, T. D., Rivard, J., Abdollahian, S. (2017), "Assessment of Surface Infiltration Performance and Maintenance of Two permeable pavement Systems in Kentucky", *Journal of Sustainable Water in the Built Environment*, Jun. 30, 2017, American Society of Civil Engineers, Reston, VA, which is incorporated by reference herein in its entirety. Using the progression of a clog 106, a clogging "wave" is captured using sensors 108. Sensors 108 are installed in a systematic manner that includes an up gradient plan area 102 from a stormwater inlet 110 within the permeable pavement 104 paved plan area 102.

Sensors 108 are placed at the lowest elevations (i.e. where water exits the site in a 100% impervious surface 112 condition) as well as all local low spots (i.e. anywhere in a parking lot interior where a catch basin would be required in a 100% impervious surface 112 condition). For example, in FIG. 1, sensors 108 are placed at locations $S_1$, $S_2$, and $S_3$. A minimum of 2 sensors 108 per parking lot or curb section (e.g., plan area 102) are used to increase reliability. For example, if a sensor 108 goes offline (e.g., loses power) or stops working correctly, other sensors 108 will still detect clogging. Advantageously, multi-sensors 108 provide a more holistic picture of the plan area 102 or site and enhance indications, e.g., of where clogging is taking place and how much clogging has occurred within the plan area 102. For example, multi-sensors 108 predict and monitor the extent of clogging in relation to roadway and/or parking applications.

In a roadway application, generally the top subgrade or surface 112 is shaped to match the gradient of the pavement, such that the drainage structure 114 height is uniform and the surface 112 is less permeable than the open graded stone used in the drainage structure 114. Water permeating through the pavers 116 of plan area 102 flows to sensors 108 at locations $S_1$, $S_2$, and $S_3$ in low spots/elevations regardless of whether clogging occurs at the top subgrade or surface 112.

Rainfall intensity (rainfall per hour) is generally assumed to be sufficiently greater than the permeability of the subgrade surface 112. For example, some rain events (e.g., where the rainfall intensity is less than the permeability of the subgrade) will not trigger the float sensors 108. Other rain events (e.g., where the rainfall intensity is significantly greater than the permeability of the subgrade surface 112) exceed the capacity of float sensors 108. In such instances, a rainfall intensity, duration, and frequency (e.g. 1-hour duration for a 10, 50, 100-year frequency) is determined for the particular drainage structures 114 and/or plan area 102. The design of drainage structure 114 and plan area 102 are used to calibrate the capacity of sensors 108. The rate at which a float sensor 108 rises and/or lowers during or after a rain event is estimated based on this design.

A "rational method" is used to estimate and determine infiltration volume and tributary volume for each sensor 108. The rational method is defined as:

$$Q = \frac{c \cdot i \cdot A}{Z} = c \cdot i \cdot A$$

in which "Z" is a conversion factor (1.0 for U.S. customary units), "c" is a surface 112 runoff coefficient (0.85-0.95 for asphalt pavement and 0.00 for ideal clean unclogged permeable pavement 104 plan areas 102), "i" is average rainfall intensity (in./hr.), and "A" is the pavedrain catchment area (acres), e.g., plan area 102.

The rational method expression relies on several assumptions. Time of concentration for drainage plan area 102 is assumed to be less than the duration of peak rainfall intensity. Computed runoff is assumed directly porportional to rainfall intensity. Rainfall intensity is assumed uniform throughout duration of the storm. Frequency of occurrence for the peak discharge is assumed to be the same as the frequency of the rainfall producing that event. Uniform distribution of rainfall over the drainage plan area 102, a scalable 10 minute duration, and a maximum plan area 102 watershed of 200 acres, are also assumed.

A modified rational method expression is used in the implementation of permeable pavement system 100. The infiltration rate into the permeable pavement system is given by, $$Q_i = (1-c) \cdot i \cdot A$$

For highly permeable pavement 104, the runoff coefficient "c" is very small or close to 0.0. For impervious surfaces 112, is the runoff coefficient "c" is close to 1.0.

Runoff coefficients of specific permeable pavement are being studied per ASTM C1701/C1701M-09 on two-year-old, uncleaned permeable pavement installations. (See Chopra, M., Hardin, M., Gogo-Abite, I, Lassen, K. (2016). *PERMEABLE PAVEMENT permeable pavements*, Final Report, Stormwater Management Academy, University of Central Florida, Orlando, FL, which is incorporated herein by reference in its entirety). The study indicates that the average infiltration rate is over 1,500 in/hr. By way of comparison, other non-permeable systems hover around 3 in/hr. Therefore, a reasonable assumed c-value for permeable pavement 104 is zero (0).

Other variables affecting water-levels are considered when sizing drainage structures 114 beneath pavers 116 in a permeable pavement 104 installation, however, for any given rain event, all the other variables are either constant or measured during the event. This allows system 100 to measure clogging from one rain event and apply the measurement to the next rain event.

Figure 5A:
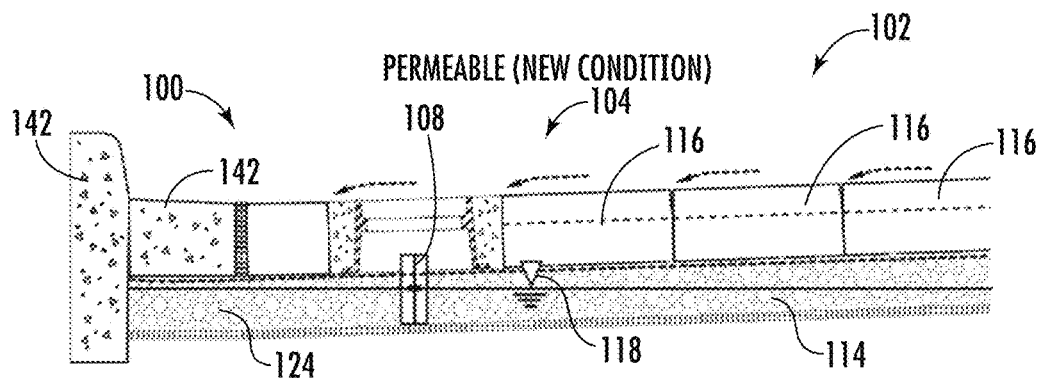
FIGS. 5A-B depict permeable pavement system clogging scenarios, according to an exemplary embodiment.
Figure 5B:
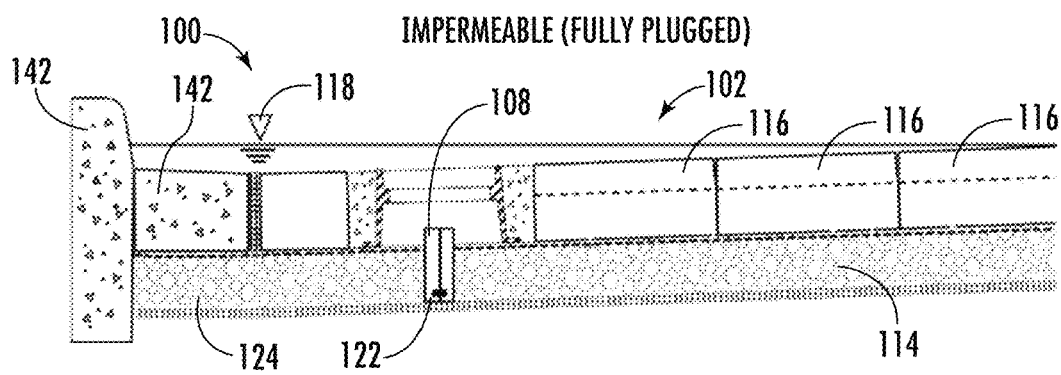

FIG. 1 is a top view of an exemplary embodiment of a permeable pavement water-level sensor system 100. Pavers 116 surround a sensor 108 that detects a water-level 118 (FIGS. 5A and 5B). Small gaps 120 between paver 116 joints make system 100 permeable to water. Water flows into sensor 108 and adjusts a float 122 located in an aggregate storage layer 124. In some embodiments, sensor 108 is located in a perforated pipe 126 and includes a PVC conduit 128 in a drainage structure 114. System 100 monitors water-levels 118 generated by water flowing through permeable surface 112 area into a water storage system or drainage structure 114 below the surface 112. In some embodiments, permeable surface 112 includes a pavement with water flow openings that drain into the water drainage structure 114 or storage system. In other embodiments, pavement sections or pavers 116 are spaced apart to generate a permeable surface with water flow openings that open into the storage system 100.

Figure 2:
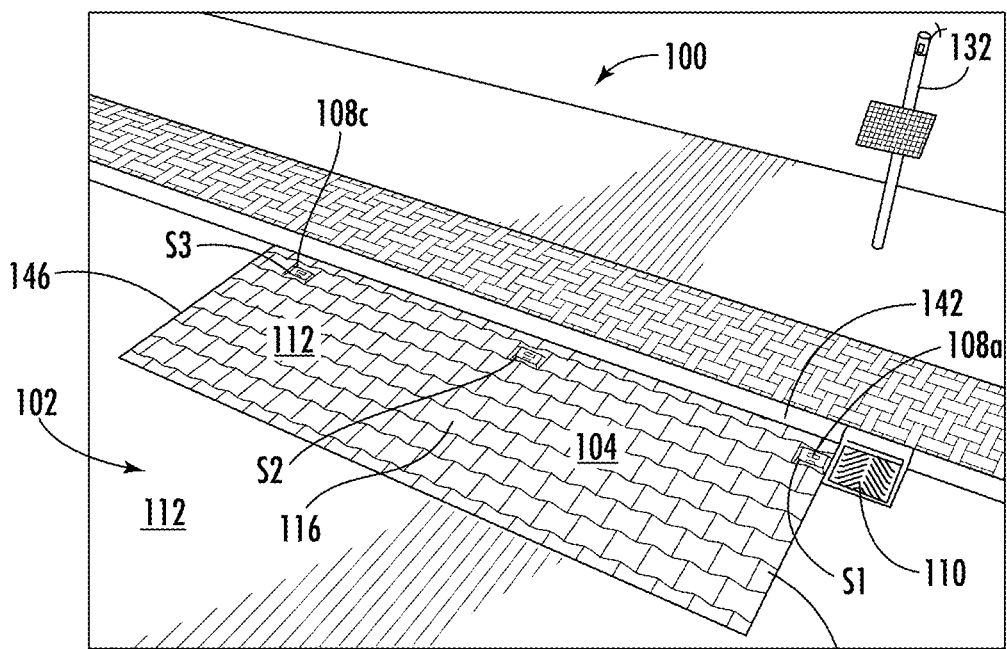
FIG. 2 depicts a permeable pavement installation with a rain intensity measuring device, according to an exemplary embodiment.

FIG. 2 shows a newly installed curb section (e.g., on June $1^{st}$) with sensor 108, the same as or similar to sensor 108 of FIG. 1. Detailed views of sensor 108 and system 100 configuration are illustrated in FIG. 3. With reference to FIGS. 1-3, sensor 108 includes electronic float 122 located in aggregate storage layer 124. In some embodiments, sensor 108 is low-power with a deep cycle marine battery 130 charged from solar energy. A tipping bucket rain gauge 132 is used to measure rainfall intensity, also powered off deep-cycle marine battery 130. Sensor 108 is housed in perforated pipe 126 in aggregate storage layer 124. Sensor 108 is powered via a PVC conduit 128 buried in drainage structure 114. In some embodiments, drainage structure 114 is a tank or a constructed storage system 100 to store or divert runoff water. In other embodiments, the water drainage structure is porous stone fill.

In some embodiments, two or more sensors 108 are located within system 100 to monitor and detect clogging events. For example, a three sensor 108 system 100 includes a first water-level sensor 108a located at a first position or location $S_1$ relative to a second sensor 108b at location $S_2$, and/or a third sensor 108c at location $S_3$. Each sensor 108 at each location $S_1$, $S_2$, and/or $S_3$, generates water-level data 134 representative of the water-level 118 at that location $S_1$, $S_2$, or $S_3$. The generated data 134 is stored, for example, in electronic memory 136 where it can be processed with a data 134 processor 138.

As will generally be understood from the description below, sensors 108 are placed in various locations $S_1$, $S_2$, $S_3$, or more based on the plan area 102 design and clogging patterns. For example, system 100 can be configured for curb/gutter applications that drain to a rainwater inlet 110 or stormwater drain. Similarly, system 100 can be configured to detect clogging in flat parking lot, paved flat surfaces, with or without permeable pavement 104 strips, and/or in other watershed or plan areas 102. For example, system 100 can prevent agricultural flooding in a field, residential flooding in a flood zone, and/or commercial flooding (e.g., with permeable and/or impermeable layers), and may also be implemented in run-off or storage systems 100 drain facilities to confirm proper operation of the storm system 100 drainage facility. Some of these applications are outlined generally in the figures and description that follows.

Application 1—Curb, Gutter and Inlet Application

Figure 4:
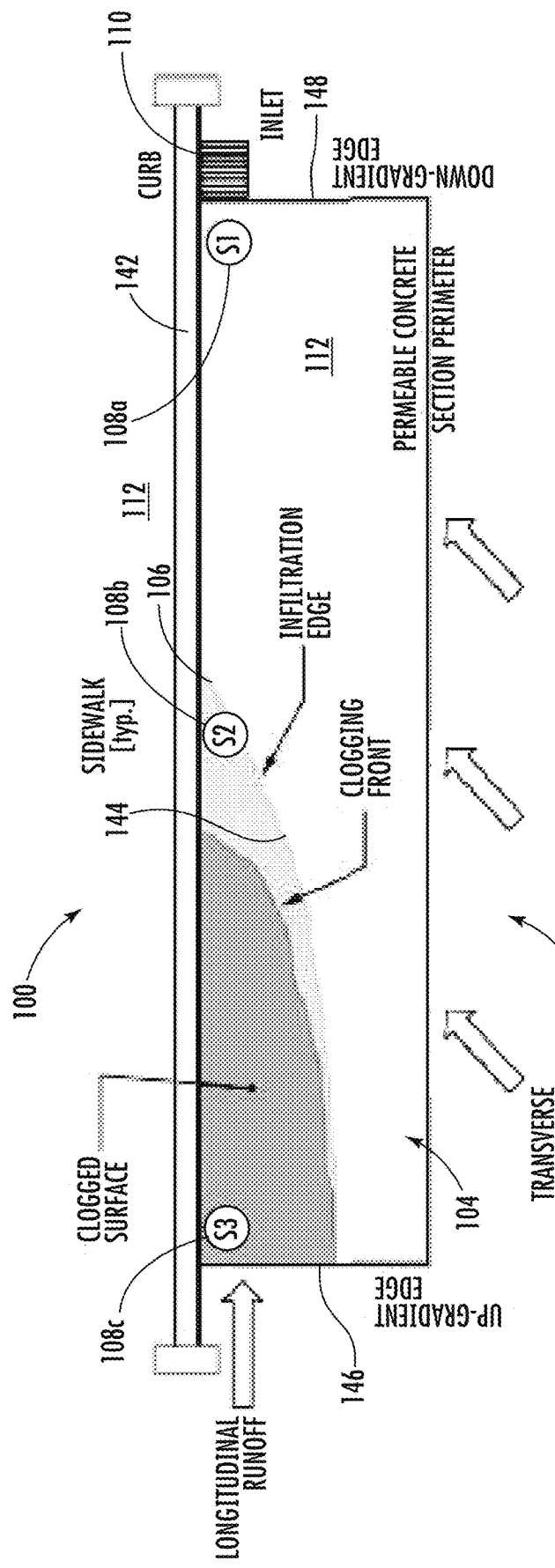
FIG. 4 depicts permeable pavement clogging progression, according to an exemplary embodiment.

The application in FIGS. 2 and 4 includes three sensors 108 at locations $S_1$, $S_2$, and $S_3$. Location $S_1$ is closest to the "overflow" stormwater inlet 110 or drain. Locations $S_2$ and $S_3$ are evenly spaced in low areas 140 throughout the length of permeable pavement 104 defining a permeable area that is located near or adjacent to a roadway gutter 142.

As a hypothetical example, twelve (12) rain events are assumed over the course of a year. Each event has the same intensity (inches of rainfall per hour) and duration (e.g., hours) occurring on the first day of each month (e.g., each event is temporally spaced 1 month from the other). During the first few rain events minimal to no clogging of the permeable pavement 104 occurs, since system 100 is free of clogs 106. Three sensors 108 (e.g., at locations $S_1$, $S_2$, and $S_3$) experience similar water-level 118 readings with a slight time delay in the rate $r_1$, $r_2$, and $r_3$ of elevation rise in each sensor 108 at locations $S_1$, $S_2$, and $S_3$. In other words, in the unclogged system of FIG. 2, sensor 108 at location $S_3$ experiences a rate $r_3$ change that is greater than $r_2$ and $r_1$, at locations $S_2$ and $S_1$, respectively. Sensor 108b at location $S_2$ experiences a rate change $r_2$ that is greater than $r_1$ at location $S_1$, but less than $r_3$ at location $S_3$. Similarly, sensor 108a at location $S_1$ experiences a rate change $r_1$ that is less than the rate changes $r_2$ and $r_3$ seen at locations $S_2$ and $S_3$ respectively. However, upon reaching a steady state the rate of changes $r_1$, $r_2$, and $r_3$, for each sensor 108 at locations $S_1$, $S_2$, and $S_3$, respectively; are approximately equal.

This is best illustrated by looking at the direction of flow in the unclogged case and the clogged case of FIG. 2. In the unclogged case, sensors 108 receive run-off in a direction parallel (longitudinal direction) and perpendicular (transverse direction) to gutter 142 and the permeable pavement 104 in the paved plan area 102. At the beginning of an event in unclogged operation, sensors 108a, 108b, and 108c at locations $S_1$, $S_2$, and $S_3$ receive approximately equal transverse runoff, whereas the runoff in the longitudinal direction is greatest at location $S_3$, followed by $S_2$, and then $S_1$, which has the greatest permeable paved area in the longitudinal direction. Once the system reaches steady state, all three sensors 108 receive approximately equal longitudinal runoff.

In a clogged state, as shown in FIG. 4, sensor 108c at $S_3$ "taps out" or exceeds the capacity to measure additional runoff. Thus the rate $r_3$ of change at sensor 108c approaches zero. Sensor 108b at location $S_2$ receives the longitudinal runoff that passes through clog 106 and the transverse runoff resulting in a slightly elevated rate $r_2$, whereas sensor 108a at location $S_1$ receives approximately equal runoff as in the unclogged case, and retains approximately the same rate $r_1$. In other words, as clog 106 develops over time (e.g., after several rain events) it follows a defined and recognizable pattern. Because, in the application of FIG. 4, the pavement slopes in a manner that creates surface 112 runoff in the longitudinal and transverse directions, debris that will cause clogging of the permeable pavement 104 progresses from left to right in FIG. 4. Clogging begins at sensor 108c and moves toward sensor 108a and inlet 110 over time. Therefore, with each rain event a delay in the readings at location $S_3$ is observed comparing the data 134 with the first couple of events. The extent to which a significant percentage of surface 112 of permeable pavement 104 is plugged identifies the maintenance objectives and provides motivation for sensor 108 placement and the sensor system 100.

FIG. 5A shows a fully permeable surface 112 where all runoff is directed to the storage system 100 aggregate layer below. FIG. 5B shows a clogged permeable pavement 104 surface 112 and no surface 112 runoff drains into the storage system 100 aggregate layer. With reference to FIG. 5A, when the permeable pavement 104 system 100 is unplugged/unclogged and operating at 100% efficiency, surface 112 runoff enters storage system 100 in both the transverse and longitudinal directions as shown in FIG. 4. Sensor $S_3$ receives the most surface 112 runoff initially as runoff will be traveling from impermeable pavement located "upstream" of the permeable pavement 104 segment and overflow/clog inlet 110. A subgrade surface 112 slope results in water accumulation in the storage system 100 layer below (FIGS. 6A-B).

Figure 6A:
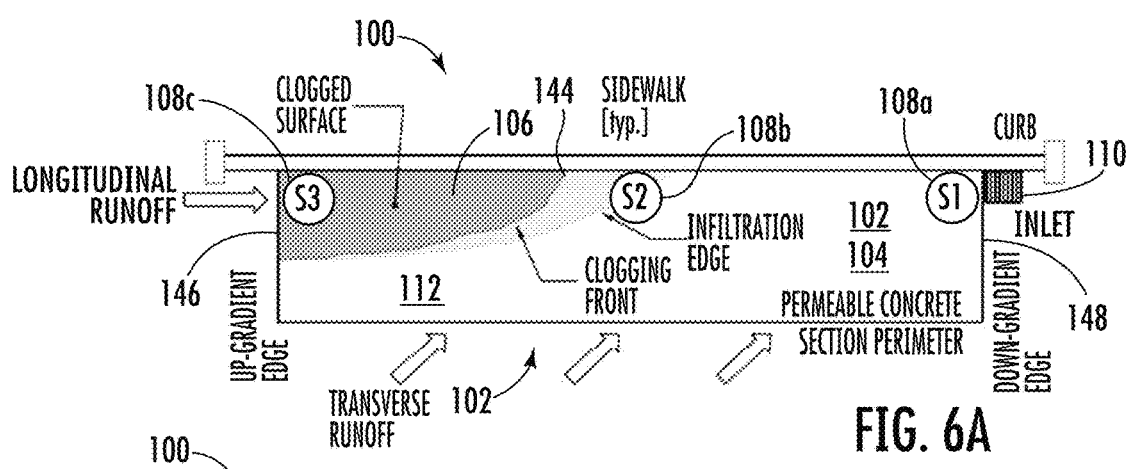
FIG. 6A depicts stormwater storage and FIG. 6B depicts sensor height for the stormwater storage shown in FIG. 6A, according to an exemplary embodiment.
Figure 6B:
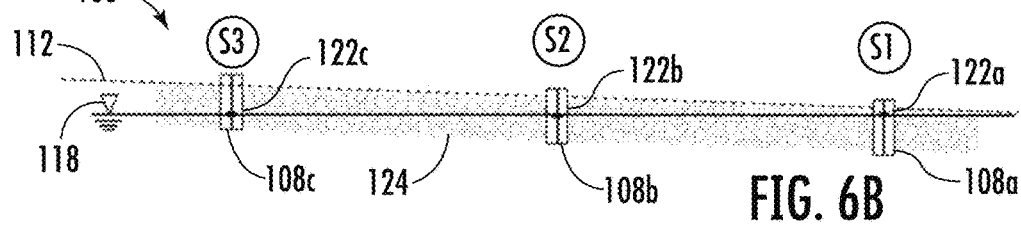

FIGS. 6A-B show system 100 at steady state without clogging (perfectly pervious) that defines a water-level 118. When a clog front 144 and/or the permeable pavement 104 surface 112 is plugged, system 100 detects the location and amount of flooding. Clogging of permeable pavement 104 surface 112 generally begins at the up-gradient edge 146 (FIG. 4) where the most significant portion of debris enters permeable pavement 104 plan area 102. As runoff moves across the clogged areas, it migrates the clog front 144 towards the down-gradient edge 148 and inlet 110.

With reference to FIGS. 4-6B, when permeable pavement 104 surface 112 is completely free from debris and the all joints are open, sensor 108c at location $S_3$ experiences the first rate $r_3$ change and rises first as the most runoff (longitudinal and transverse) in system 100 accumulates. Sensors 108b and 108a experience a lower rate $r_2$ and $r_3$ change, because these locations $S_2$ and $S_3$ experience predominantly transverse runoff (e.g., longitudinal runoff is clogged at location $S_2$). At or near the end of the rainfall event, sensors 108a, 108b, and 108c all rise to the water-level 118 in the storage system 100 layer (FIGS. 6A-B) as the water moves into the storage system 100.

If the permeable pavement 104 surface 112 is completely and perfectly plugged (perfectly impervious), system 100 performs like a traditional impervious pavement drainage system, e.g., with no rise at any of the three sensors 108a, 108b, 108c, because there is no migration of runoff into storage system 100.

Figure 7A:
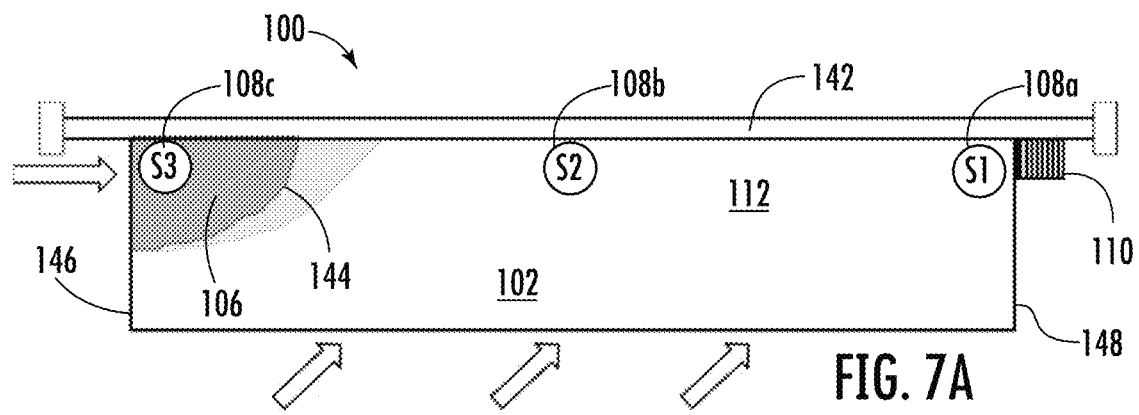
FIGS. 7A-C depicts clogging front progression various positions.
Figure 7B:
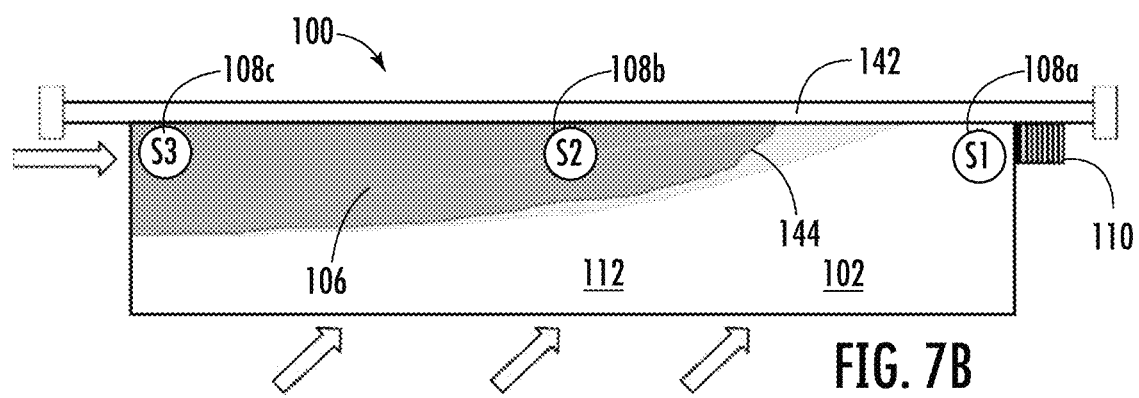
Figure 7C:
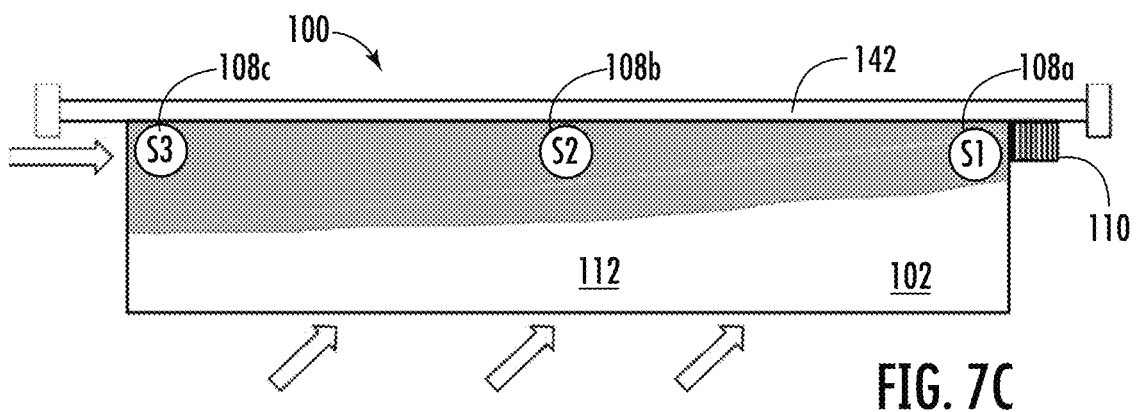

A system 100 that is neither perfectly impervious nor perfectly pervious (e.g., a real system between the theoretical limits) has a clog front 144, as shown in FIGS. 7A-C, that progresses from up-gradient edge 146 to down-gradient edge 148. As clog 106 covers a sensor 108, runoff is directed to the next unclogged downstream sensor 108. The runoff volume directed to the next down-gradient sensors 108 causes a relative increase in the rising rate $r_1$ and/or $r_2$ of change for the down-gradient sensors 108, compared to up-gradient sensor 108 locations (e.g., $S_3$). System 100 assess the relative position of the clog front 144 by examining relative rise rates $r_1$, $r_2$, and $r_2$ of float sensors 108a, 108b, and 108c in locations $S_1$, $S_2$, and $S_3$.

FIG. 7A illustrates a clog 106 in a first position covering sensor 108c. Specifically, sensor 108c at location $S_3$ is beneath a clogged permeable pavement 104 surface 112. Sensors 108b and 108c are in clog 106 free locations $S_2$ and $S_3$. Runoff reaches locations $S_2$ and $S_1$ without infiltration into the up-gradient permeable pavement 104 surface 112. As such, sensor 108b at location $S_2$ rises more rapidly (e.g., experiences a rate $r_2$ of change) than sensor 108a at location $S_1$. Sensor 108c at location $S_3$ rises the slowest (e.g., experiences the slowest rate $r_3$ of change) of the three sensors 108 as the rise at location $S_3$ is dictated by a water-level 118 that pushes up-gradient and fills down gradient (FIGS. 6A-B) and includes transverse runoff affecting the water-level 118 rise and sensed rate $r_3$ of change. Relatively speaking, FIG. 7A depicts a reasonably well-defined portion of the permeable pavement surface 112 as being plugged. The relative behavior of sensors 108a, 108b, 108c $S_1$, $S_2$, $S_3$ in this case would indicate roughly 25% of the permeable pavement 104 surface 112 is clogged.

As clog front 144 progresses in FIG. 7B towards down-gradient edge 148 of the permeable pavement 104 system 100, surface 112 runoff is pushed into location $S_1$, causing sensor 108a to experience a high rate $r_1$ of change. Rates $r_2$ and $r_3$ of rise in sensors 108b and 108c include predominantly transverse runoff and any migration of the water in storage system 100 layer flowing in the up-gradient direction. Thus, sensor 108a at location $S_1$ rises the quickest (e.g., experiences the greatest rate $r_1$ of change), followed by sensor 108b, which is followed by sensor 108c. The sensors 108 behavior indicates a clog 106 range between 25% to 50% of the permeable pavement 104 surface 112 being clogged.

As clog front 144 progresses in FIG. 7C it extends from up-gradient to down-gradient edges 146 and 148. Sensors 108 at locations $S_1$, $S_2$ and $S_3$ rise from predominantly transverse runoff and migration of runoff through the aggregate storage system 100. The sensors 108 rise is relatively slow compared to the rises of sensors 108 in FIGS. 7B and 7A. Sensor 108 behavior indicates approximately 50% or more of the permeable pavement 104 surface 112 is clogged.

To correlate multiple sensor 108 readings to clogged surface 112 plan area 102, the expected rates (e.g., $r_1$, $r_2$, $r_3$, and/or others) are determined relative to the locations (e.g., $S_1$, $S_2$, $S_2$, and/or others) and mapped. Traditionally, vacuum maintenance is only performed during bi-annual inspection cycles or when 50% of the joints are clogged or otherwise filled with dirt/debris. In contrast, system 100, for example, recommends individualized maintenance only when sensor 108c at location $S_3$ triggers first, e.g., after initiation of tipping bucket rain gauge 132.

For example, electronic memory 136 and a data 134 processor 138 couple to sensors 108 to store water-level 118 data 134 collected at sensors 108 for times $t_0$ to $t_n$, where $t_0$ represents the water-level 118 prior to a rainfall event. In some embodiments, times $t_1$ to $t_n$ are measured in minute increments (e.g., every 5 min, 10 min, 15 min, 30 min, 45 min, or 60 min) or hour increments (e.g., every 1 hr, 2 hrs, 3 hrs, etc). The water-level data 134 is used to generate a change rate $r_1$ to $r_n$ for a first sensor 108a (e.g., where $r_1$ represents the change between $t_0$ and $t_1$ and $r_n$ represents the change between $r_{n-1}$ to $r_n$). Similarly, water-levels 118 are measured at one or more additional sensors 108 to compare the rates of change (e.g., $rr_1$ to $rr_n$) at each time $t_1$ to $t_n$ for the water-level 118 at each sensor 108 location $S_1$, $S_2$, $S_3$, and/or other locations.

The rates of change $r_1$ to $r_n$ and $rr_1$ to $rr_n$, etc for each sensor are used to compute comparison data 134 $c_1$ to $c_n$ for each sensor 108. Data 134 $c_1$ to $c_n$ compares the rate of change $r_1$ to $r_n$ for a first sensor 108a to rate of change data 134 $rr_1$ to $rr_n$ for at least one other sensor 108b. In some embodiments, comparison data 134 $c_1$ to $c_n$ is computed for all times $t_0$ to $t_n$, in other embodiments, a select group of times tx to ty is compared that includes a subset of the total set of event times $t_0$ to $t_1$. For example, the comparison data 134 $c_1$ to $c_n$ is divided into select groups of times tx to ty corresponding to comparison data 134 cx to cy. In addition, $t_n$ can include any number of times data 134 is sampled, including more than 50, 100, 500, 1000, 10,000, or 100,000 samples. The comparison data 134 $c_1$ to $c_n$ is stored in electronic memory 136 and/or analyzed with a data 134 processor 138 to determine problematic clog 106 locations and areas, size and shape estimates of the clog, and/or the progression of clog front 144. Change rates (e.g., r, rr, etc.) of the water-levels 118 are analyzed to determine how the comparison data 134 (e.g., c, cc, etc.) changes over time (e.g., $t_0$ to $t_n$), in reference to the water-level 118 change rates (e.g., r, rr, etc.).

In some embodiments, the processor 138 calculates or determines whether the water-level 118 change rate r for each sensor 108 is slowing relative to other sensor(s) 108 with change rate rr, based on changes in the comparison data 134 c, cc, etc. For example, the rate r of water-level 118 change is considered to have slowed relative to other sensors 108 if the rate r is slowed by some predetermined amount. In various embodiments, the threshold predetermined amount of rater change may be a rate that slows more than 5%, 10%, 15%, 20%, 25%, 30%, 40%, 50%, or more or surrounding sensors 108.

Application 2—Flat Parking Lot Application

Figure 8:
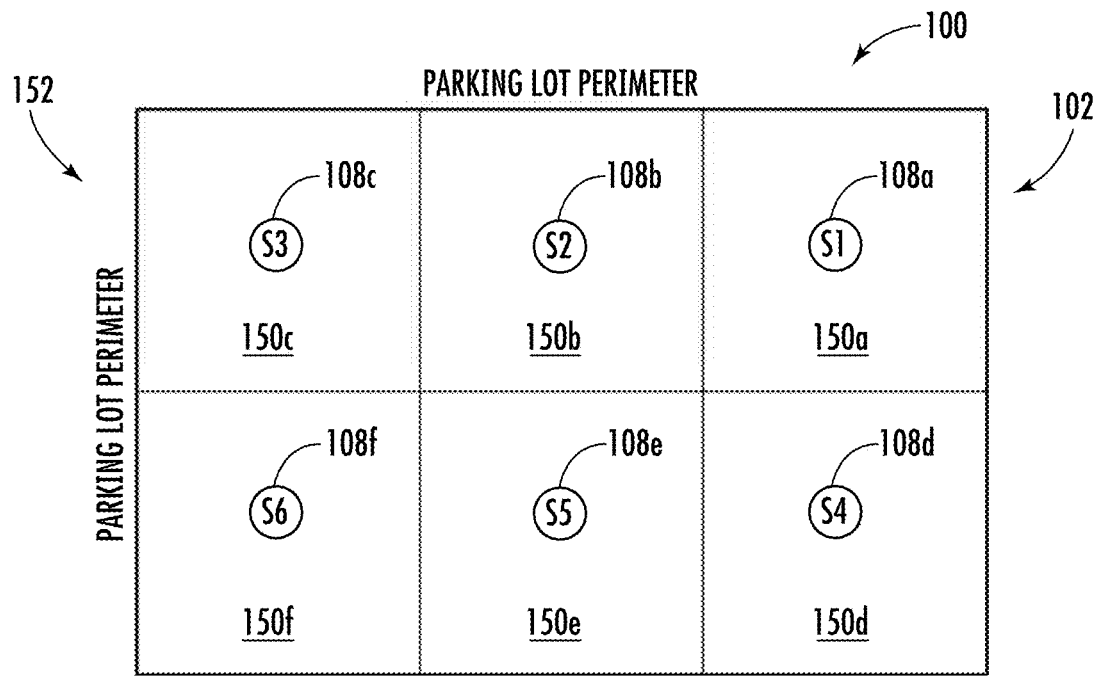
FIG. 8 depicts a Flat Parking Lot Condition with entire parking surface as permeable pavement, according to an exemplary embodiment.

FIG. 8 show a plan area 102 for a typical parking lot. The plan area 102 for the parking lot follows a "flat" grade over existing topography. If the entire parking surface 112 is permeable pavement 104 there is no surface 112 runoff over the parking lot plan area 102. Instead rainwater accumulates directly into the storage system 100 below the plan area 102.

Sensors 108 are placed in locations $S_1$-$S_6$ that divide the parking surface 112 into various tributary areas 150. The number of sensors 108 used is assessed based on the tendency for localized "clogging" in the plan area 102 of the permeable pavement 104 surface 112. In other words, sensors 108 are placed in or near in high clogging areas (e.g. areas with trees, areas adjacent to sediment runoff, etc.). In some embodiments, a grid arrangement 152, similar to FIG. 8, is used to develop a maintenance grid of sensors 108 that track clogging along surface 112. For example, processor 138 can determine locations where sensors 108 with slow water-level rates r relative to rate rr changes of other sensors 108, based on the placement of sensors 108 in the plan area 102 and the orientation of the permeable and/or impermeable pavement structures.

In some embodiments, a tipping bucket rain gauge 132 is located at the site (similar to FIG. 2) to record localized rainfall. When the tipping bucket rain gauge 132 tips, it indicates that adequate precipitation to constitute a rainfall event. In other words, once the rain gauge tips, system 100 begins an assessment of rainfall transmission into the storage system 100. Only one tipping bucket rain gauge is generally used for a large multi-acre plan area 102 such as a campus.

Figure 9:
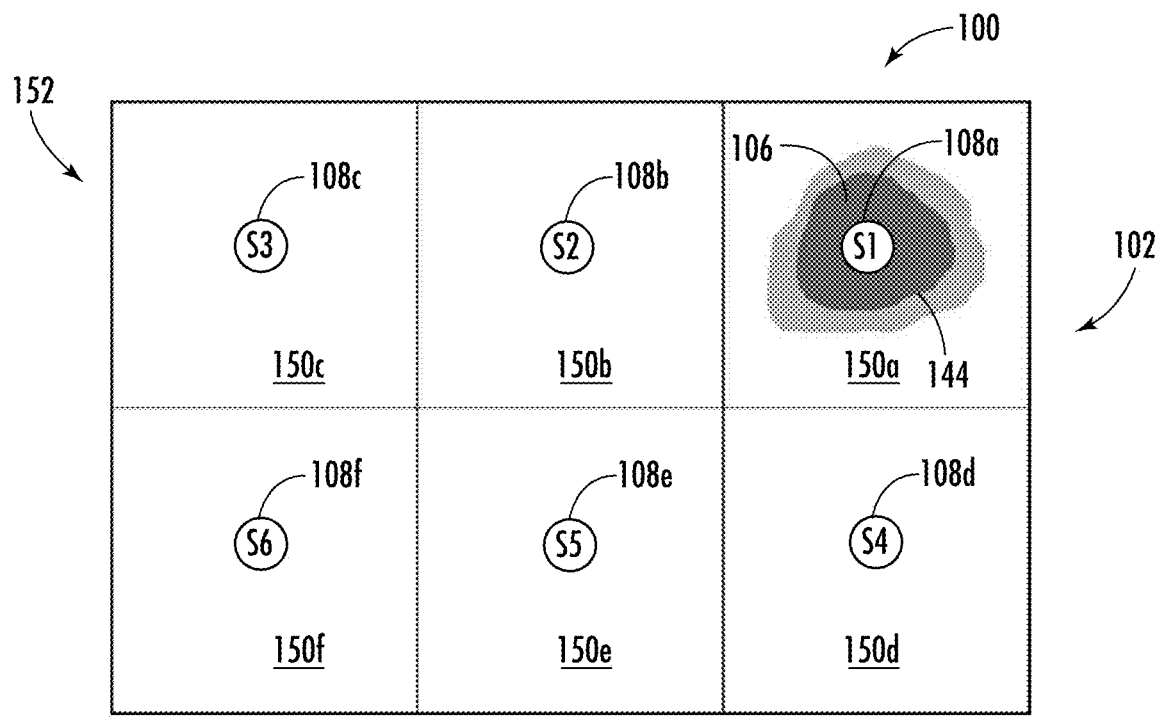
FIG. 9 depicts Clogging Condition 1 in Application 2.

FIG. 9 illustrates a clogged surface, clog front 144, and infiltration edge for clogging located in the tributary area for Sensor 1. The extent of clogging of the permeable pavement 104 in Application 2 is the same or similar as that in Application 1, with only minor differences. Clogging in the area defined by the sensor in location $S_1$ is essentially 1/6th or 17% of the parking surface 112 plan area 102. Additional sensors 108 at locations $S_2$-$S_4$ are dispersed (in this case evenly, though other configurations may be desirable, depending on the location of high clogging areas) throughout the parking plan area 102. The sensors 108 are dispersed and placed to increase the resolution of clogs, particularly in high clogging areas, to measure the extent of a clog 106 in the permeable (or impermeable) surface 112. In this configuration, each sensor location $S_1$ through $S_6$ has an associated area, labeled Area 1 through Area 6, respectively.

When the permeable surface 112 in Area 1 is clogged, sensor 108 at location $S_1$ measures water accumulation at a much slower rate $r_1$ than sensors at locations $S_2$ through $S_6$. Sensors 108 at locations $S_2$, $S_4$, and $S_4$ may see a slight increase in water accumulation due to sheet flow (e.g., overflow) runoff from Area 1. Therefore, clogging in Area 1 is defined by a slow rate $r_1$ (e.g., approaching or zero) as water accumulates at the sensor near location $S_1$. Water accumulation at sensors 108 near locations $S_3$ and $S_6$ are closely correlated with the rainfall intensity measurement, because they are largely unaffected by the clog 106 at location $S_1$. Water accumulation at sensors 108 near locations $S_2$, $S_4$, and $S_4$ are generally equal to or slightly greater than the accumulation visible at the sensors 108 at locations $S_3$ and $S_6$. Clogging in these areas correlates to sensors 108 data 134 (e.g. Area 1 and the sensor 108a located at $S_1$) that is evaluated for the entire surface 112 and presented in Table 1.

Figure 10:
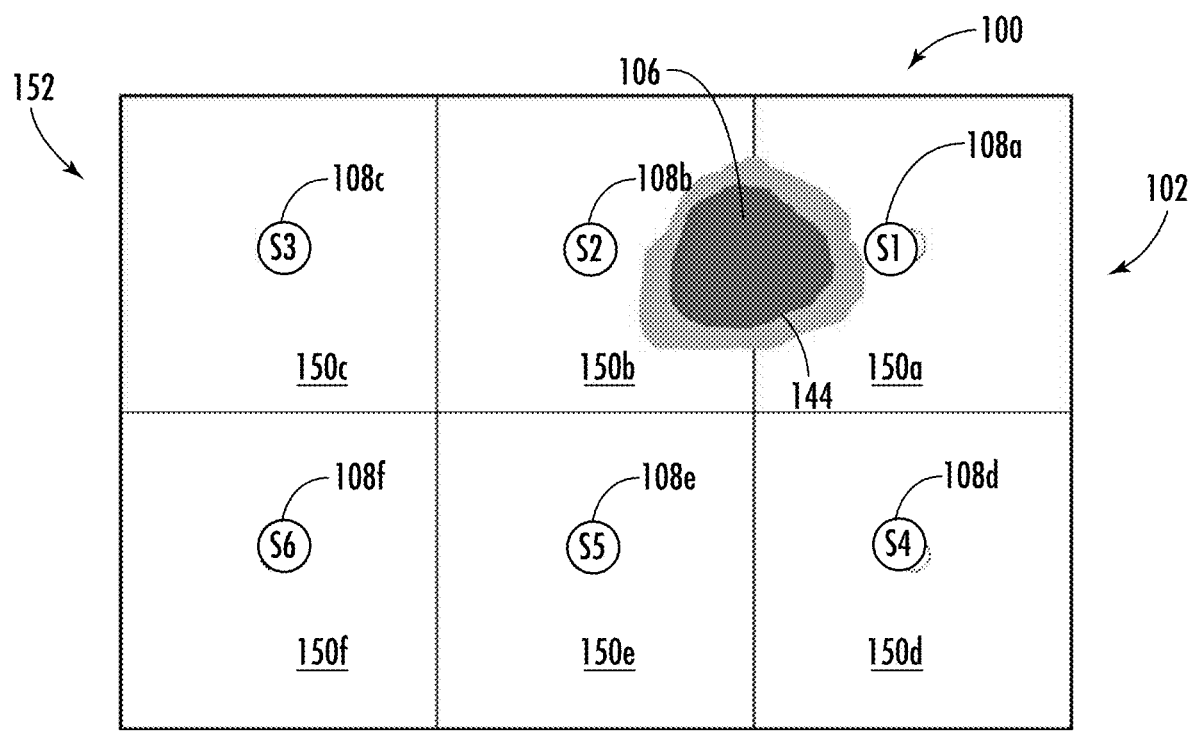
FIG. 10 depicts Clogging Condition 2 in Application 2.

A second potential clogging condition for Application 2 originates in locations $S_1$ and $S_2$ and between sensor 108 tributary areas 150, as illustrated in FIG. 10. In this case, the clogging migrates around the pavement surface 112 in two, or more, areas, specifically Area 1 and Area 2, of FIG. 10. Table 2 outlines the identification of this clogging scenario using a sensor 108 data 134 array collected from sensors 108 distributed on the parking surface 112 plan area 102.

Figure 11A:
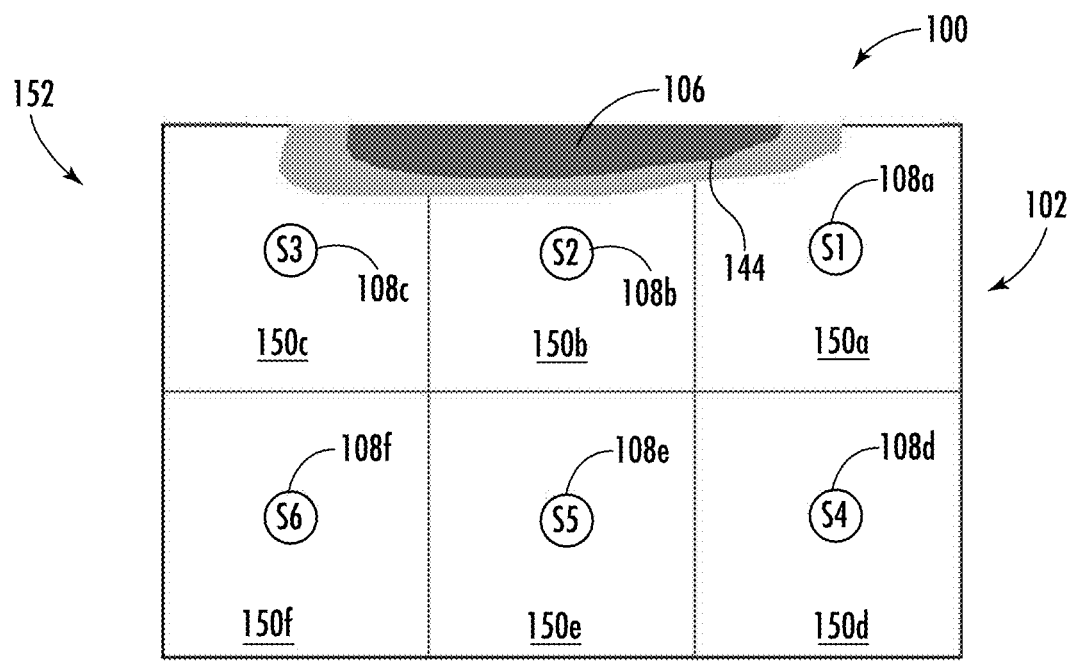
FIGS. 11A-B depict Perimeter Clogging Condition 3 for Parking Lot Application 2.
Figure 11B:
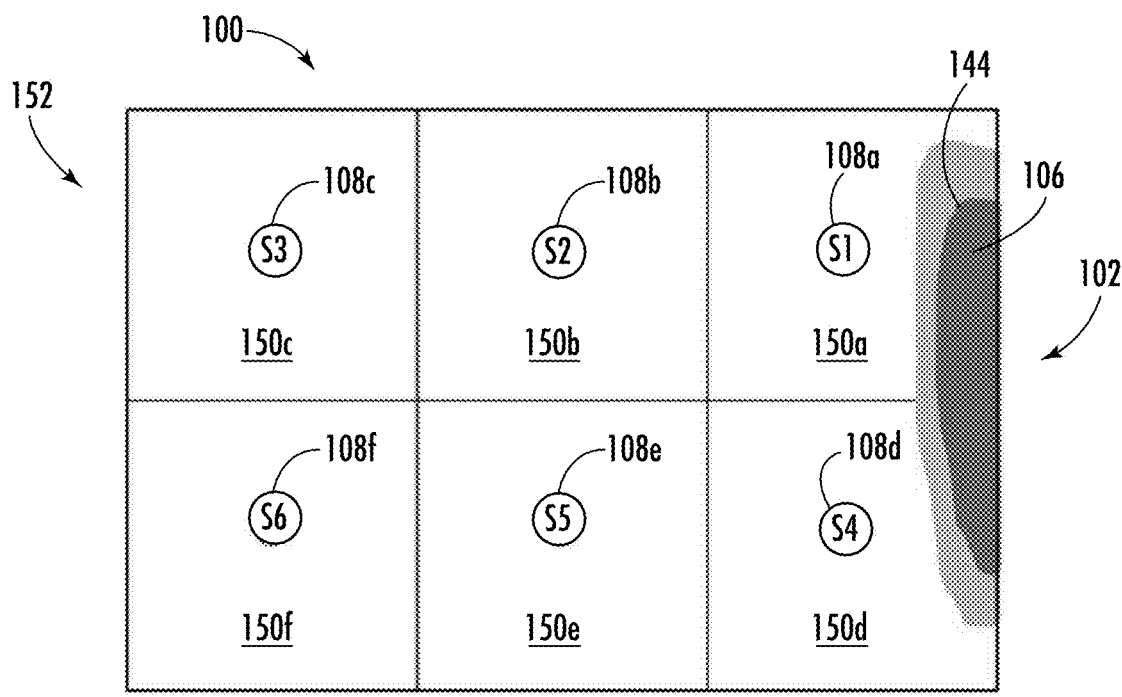

A third potential clogging condition for Application 2 occurs at a perimeter of the pavement plan area 102 bounded by series of sensors 108. Clogging around the perimeter may encompass multiple areas (e.g., one, two, or three tributary areas 150 and their corresponding sensors 108). FIGS. 11A-B illustrate some illustrative perimeter clogging scenarios for Application 2. Table 3 presents data 134 collected with a sensor 108 array (e.g., sensors 108 located at multiple locations $S_1$, $S_2$, $S_3$, $S_4$, $S_4$, $S_6$, etc.) to identify this clogging scenario.

Figure 12A:
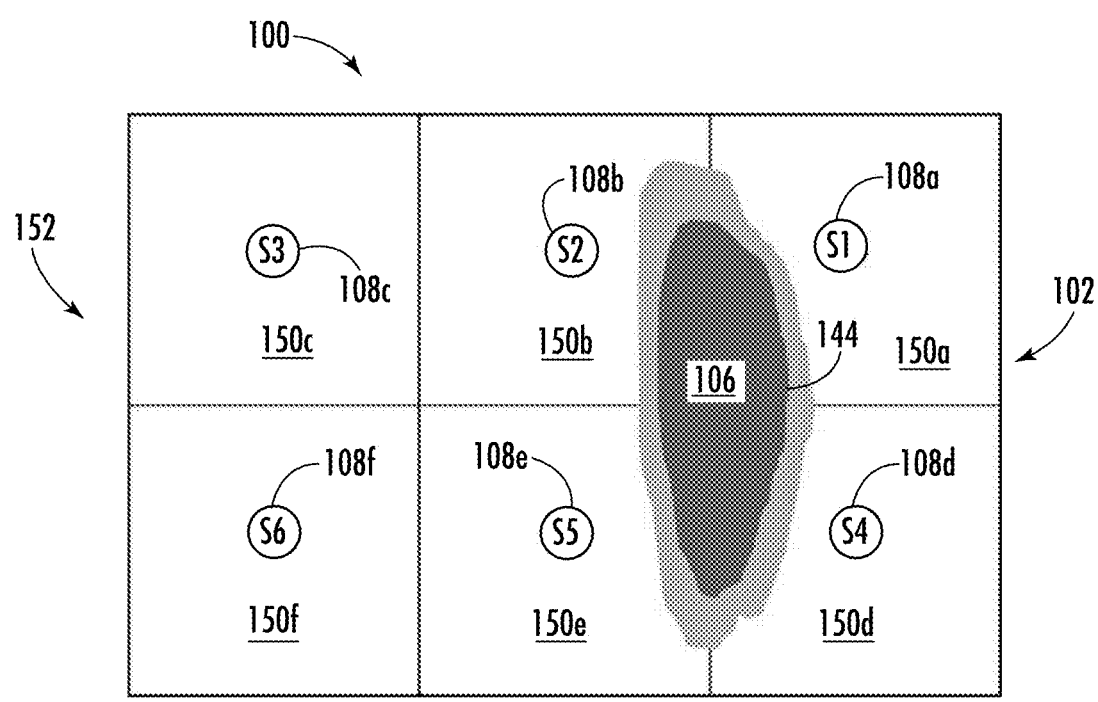
FIGS. 12A-C depict Interior Clogging Condition 4 for Parking Lot Application 2.
Figure 12B:
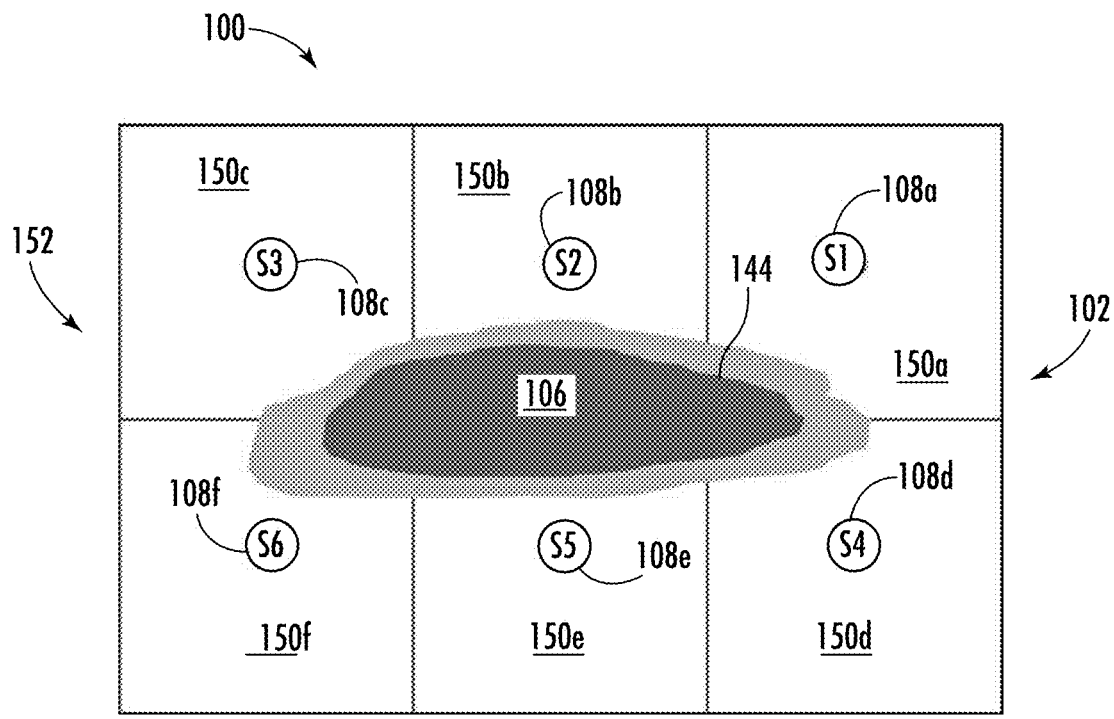
Figure 12C:
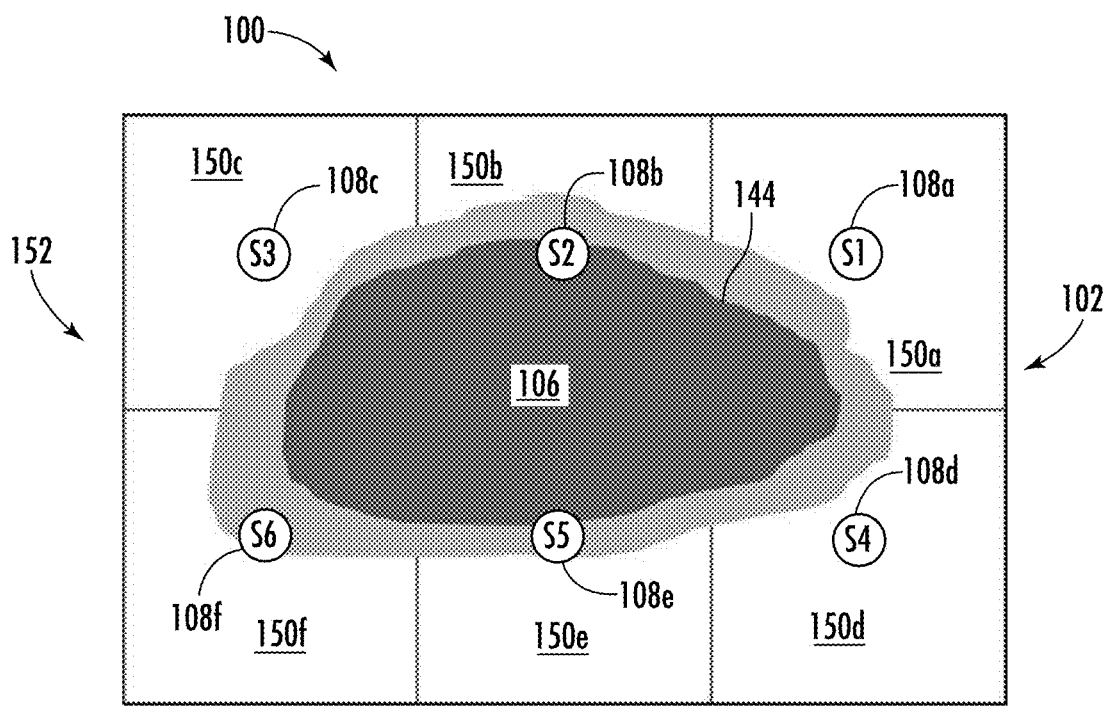

A fourth clogging condition for Application 2 occurs when a clog 106 occludes large interior portions of the pavement surface 112 (e.g., between tributary areas 150). FIGS. 12A-C illustrate some exemplary clogging scenarios. Table 4 presents data 134 that identifies this clogging scenario using the sensor 108 array on the plan area 102.

Application 3—Single Permeable Strip Parking Application

Figure 13:
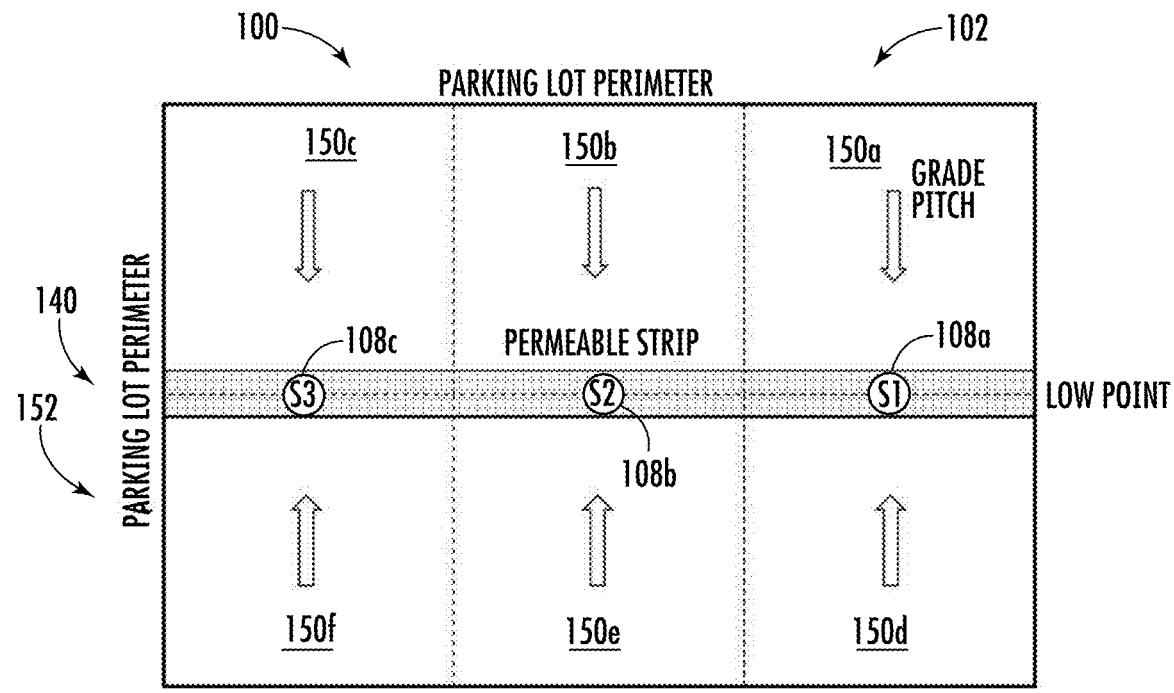
FIG. 13 depicts a Saddle-Type Parking Lot Condition with single permeable pavement strip, according to an exemplary embodiment.

A third application (Application 3) includes a parking lot with a single permeable pavement strip located at the low point of the parking surface in a saddle configuration 154. In this configuration, tributary areas 150 drain into the permeable pavement 104 in the saddle configuration 154 to drain the plan area 102. FIG. 13 illustrates this arrangement.

Figure 14A:
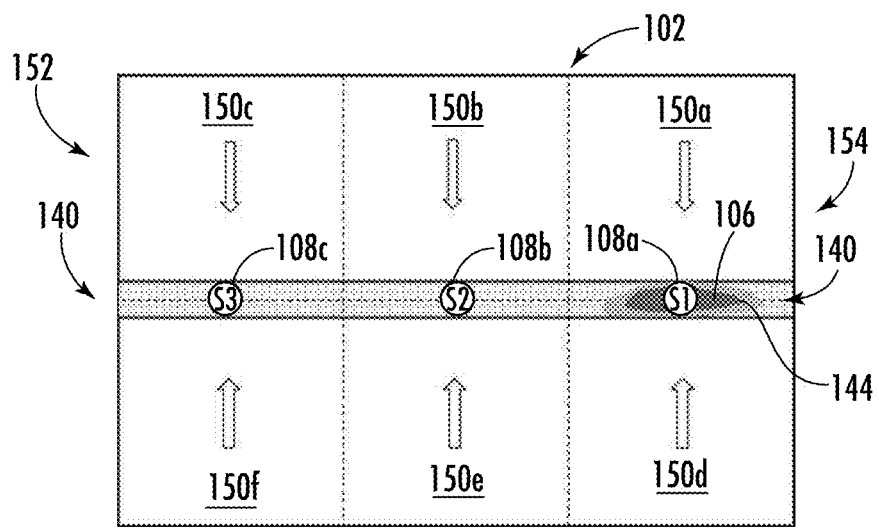
FIGS. 14A-C depict clogging scenarios for Parking Lot Application 3, according to an exemplary embodiment.
Figure 14B:
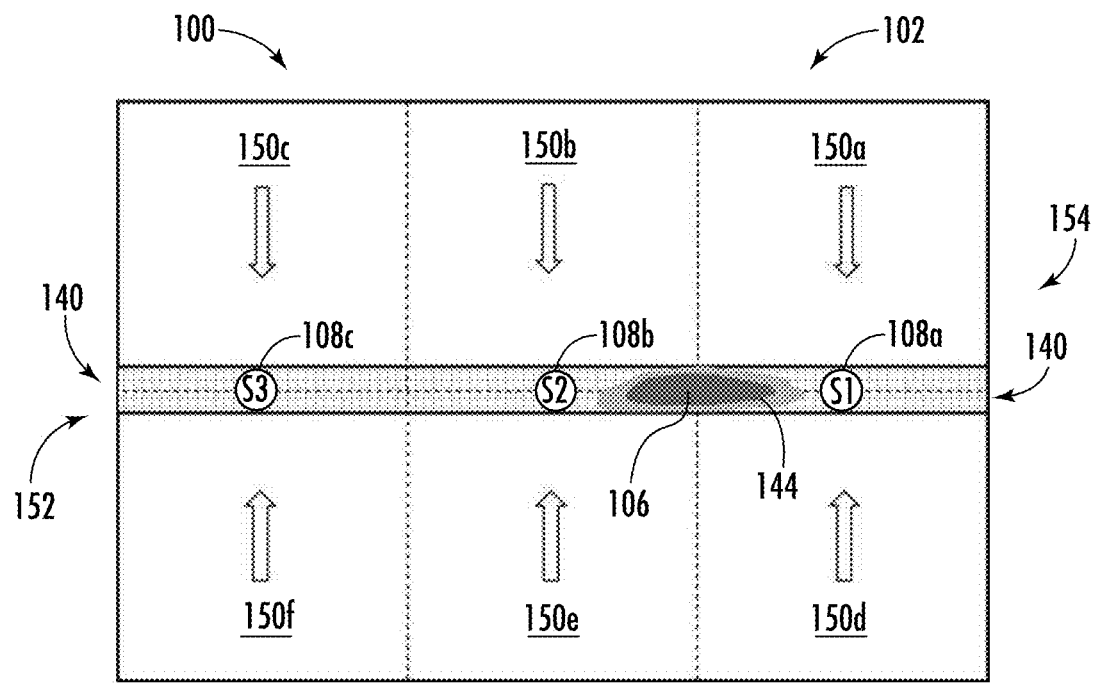
Figure 14C:
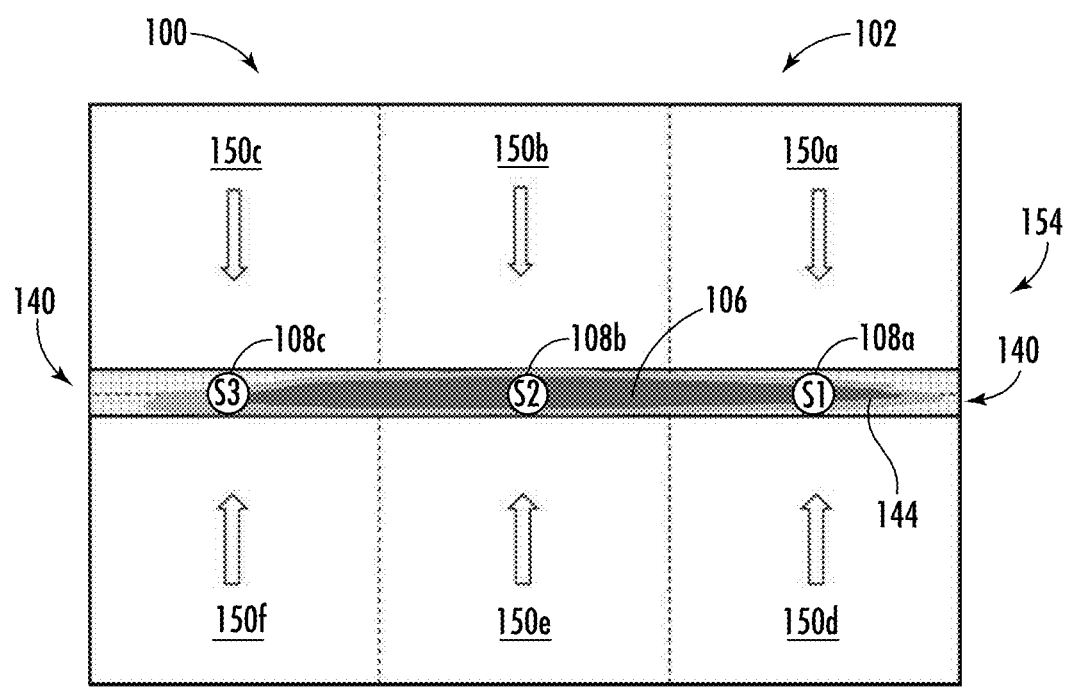

At least three clogging conditions occur in this saddle configuration 154. FIGS. 14A-C illustrate a Condition 1 clog 106 directly above a sensor 108 on the saddle configuration 154 between two or more tributary areas 150 that are a portion of the plan area 102. Table 5 presents all clogging variations for this condition and identifies data 134 that is used to identify each condition.

Application 4—Double Permeable Strip Parking Application

Figure 15:
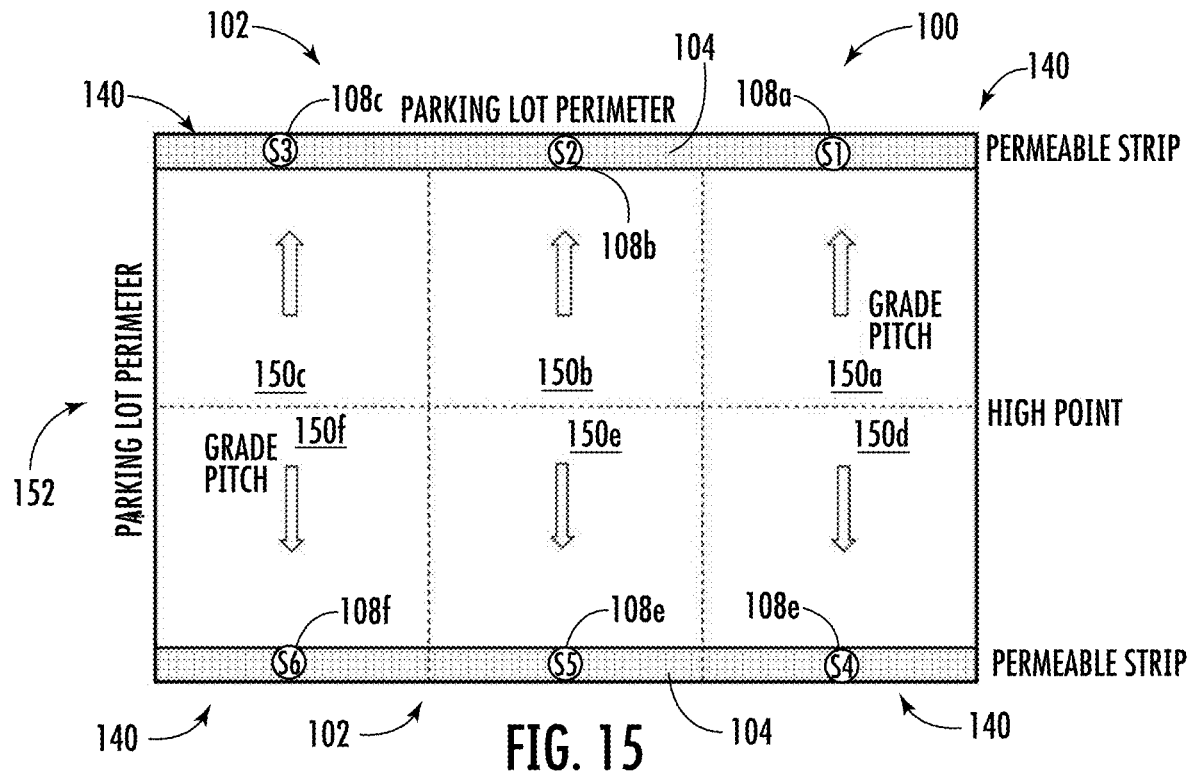
FIG. 15 depicts a Crowned Parking Lot Condition with double permeable pavement strips, according to an exemplary embodiment.
Figure 16A:
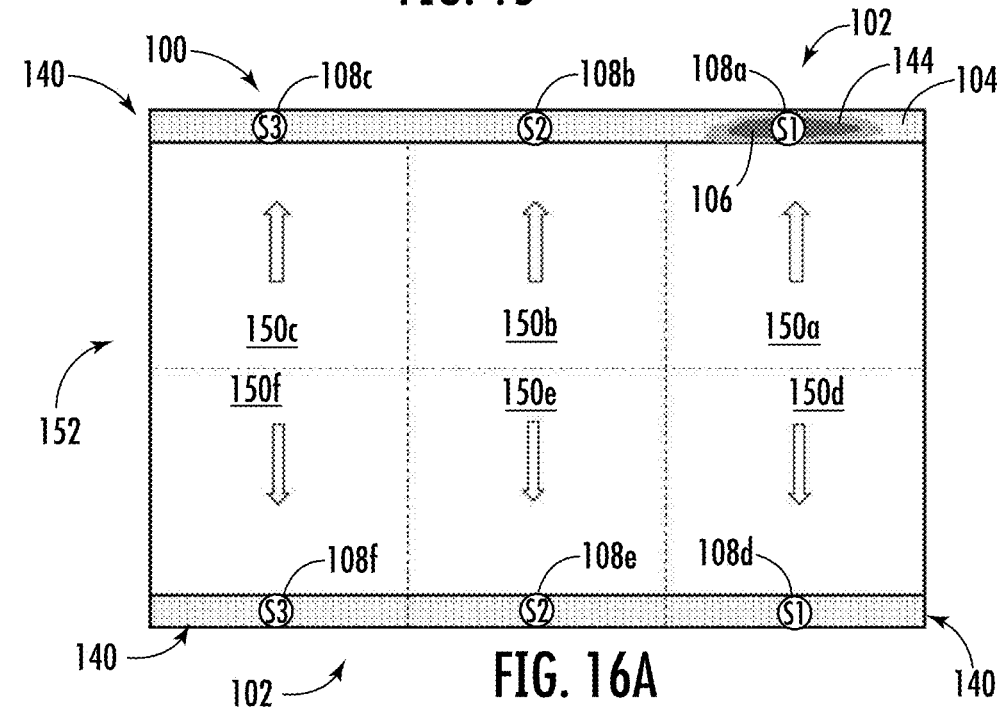
FIGS. 16A-D depict exemplary clogging scenarios for Parking Lot Application 3, according to an exemplary embodiment.
Figure 16B:
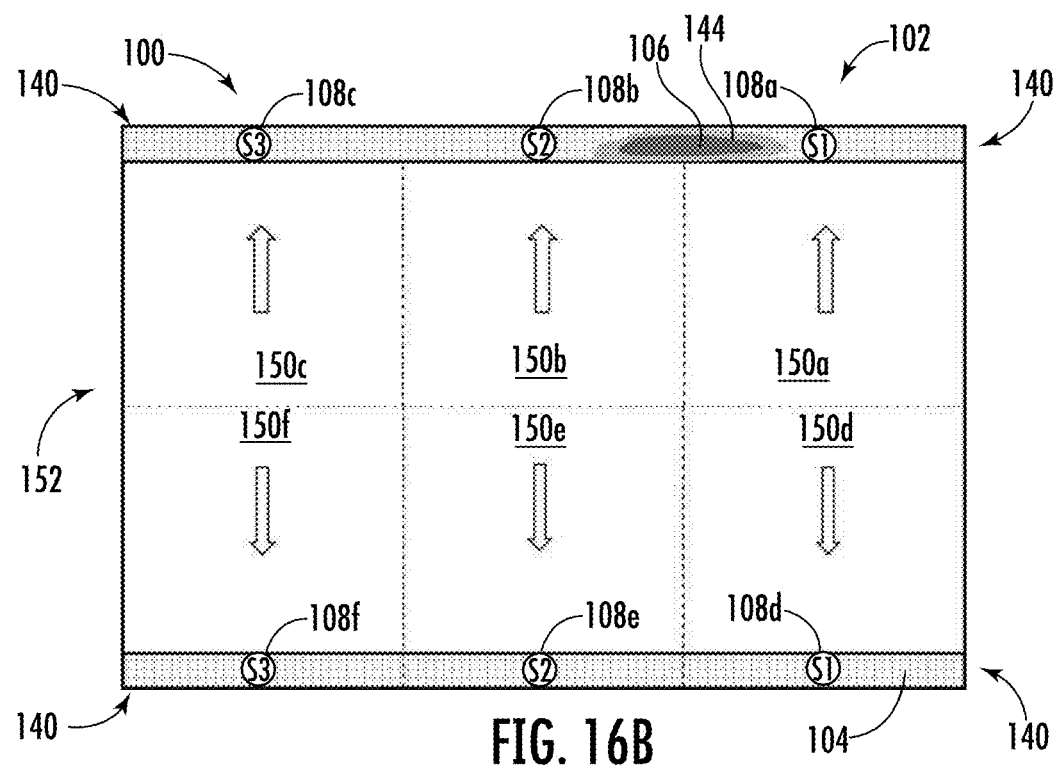
Figure 16C:
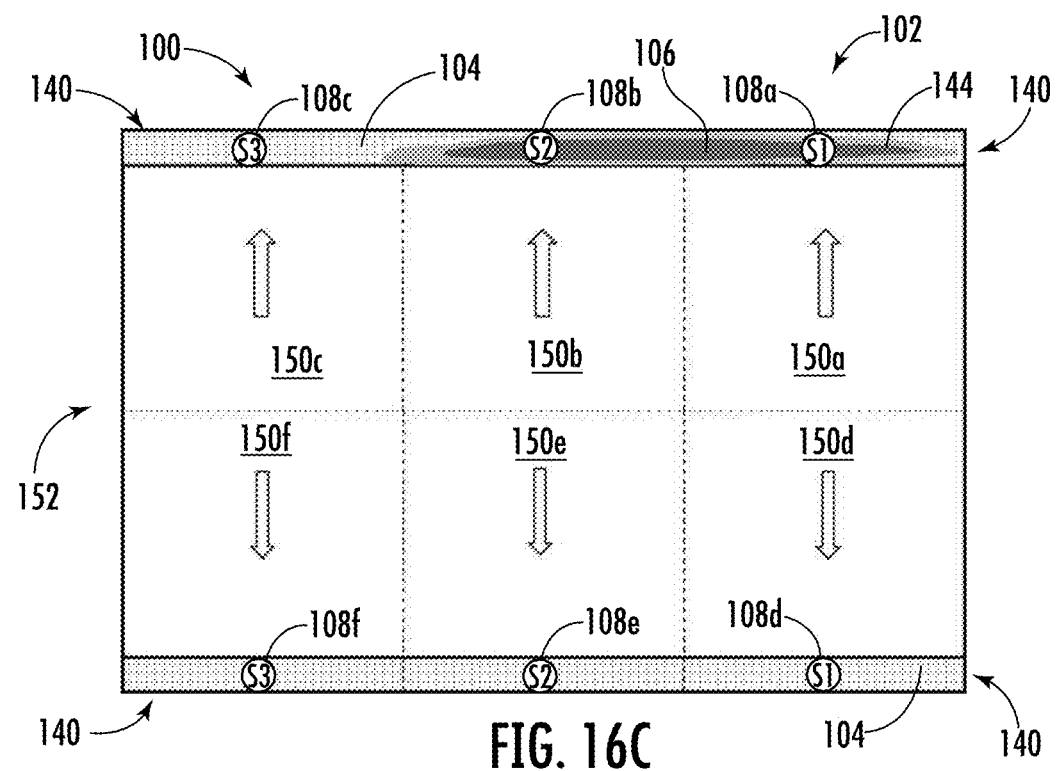
Figure 16D:
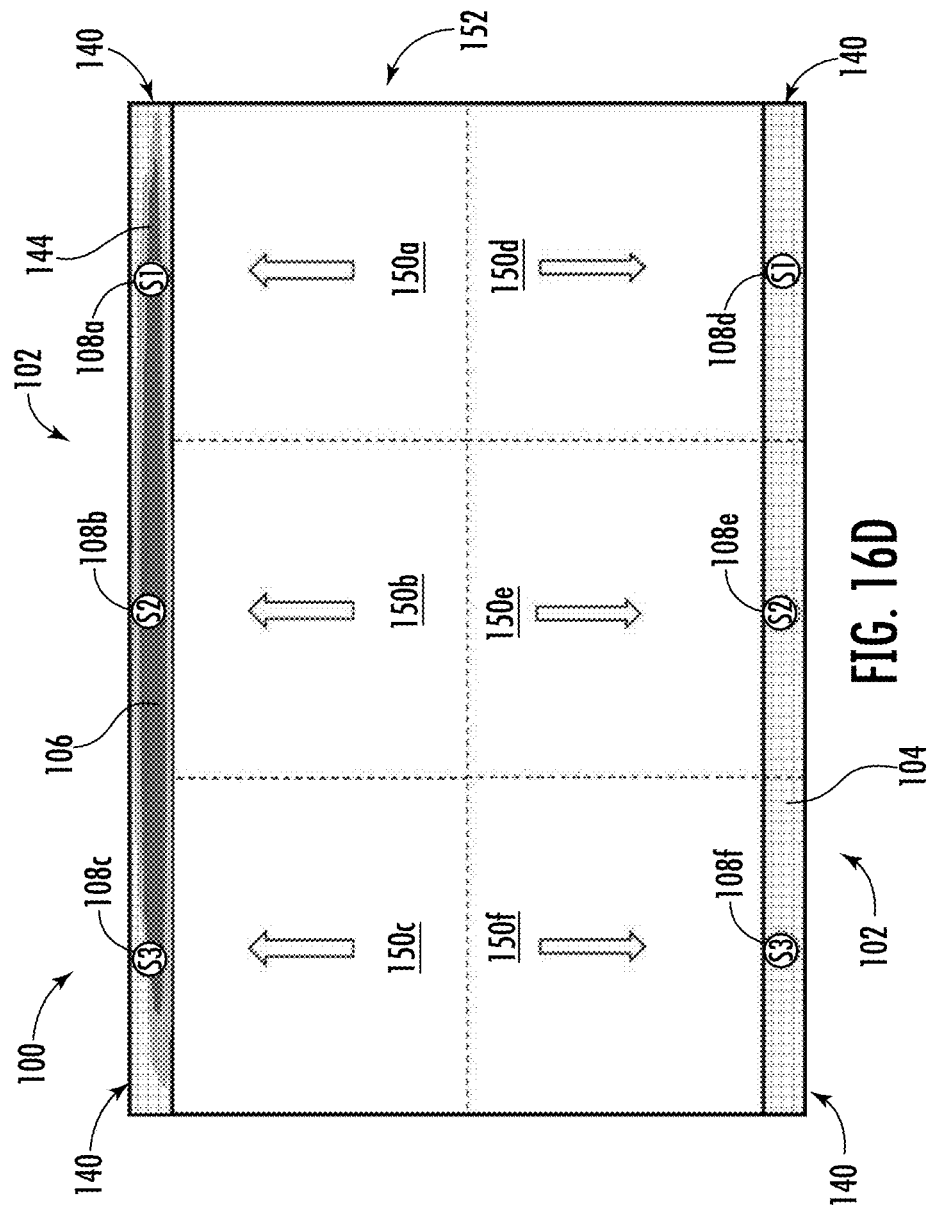

The fourth application scenario involves a crowned pavement surface 112 draining to two permeable pavement strips on either side of the crown. This implementation involves a greater number of sensors 108 as compared to Application 3. FIG. 15 illustrates one exemplary sensor 108 array layout or distribution. The clogging progression is shown in FIGS. 16A-D and sensor 108 data 134 identification of this clogging scenario is presented in Table 6.

Cloud-Based Data 134 Transmission and Management Platform

Figure 17:
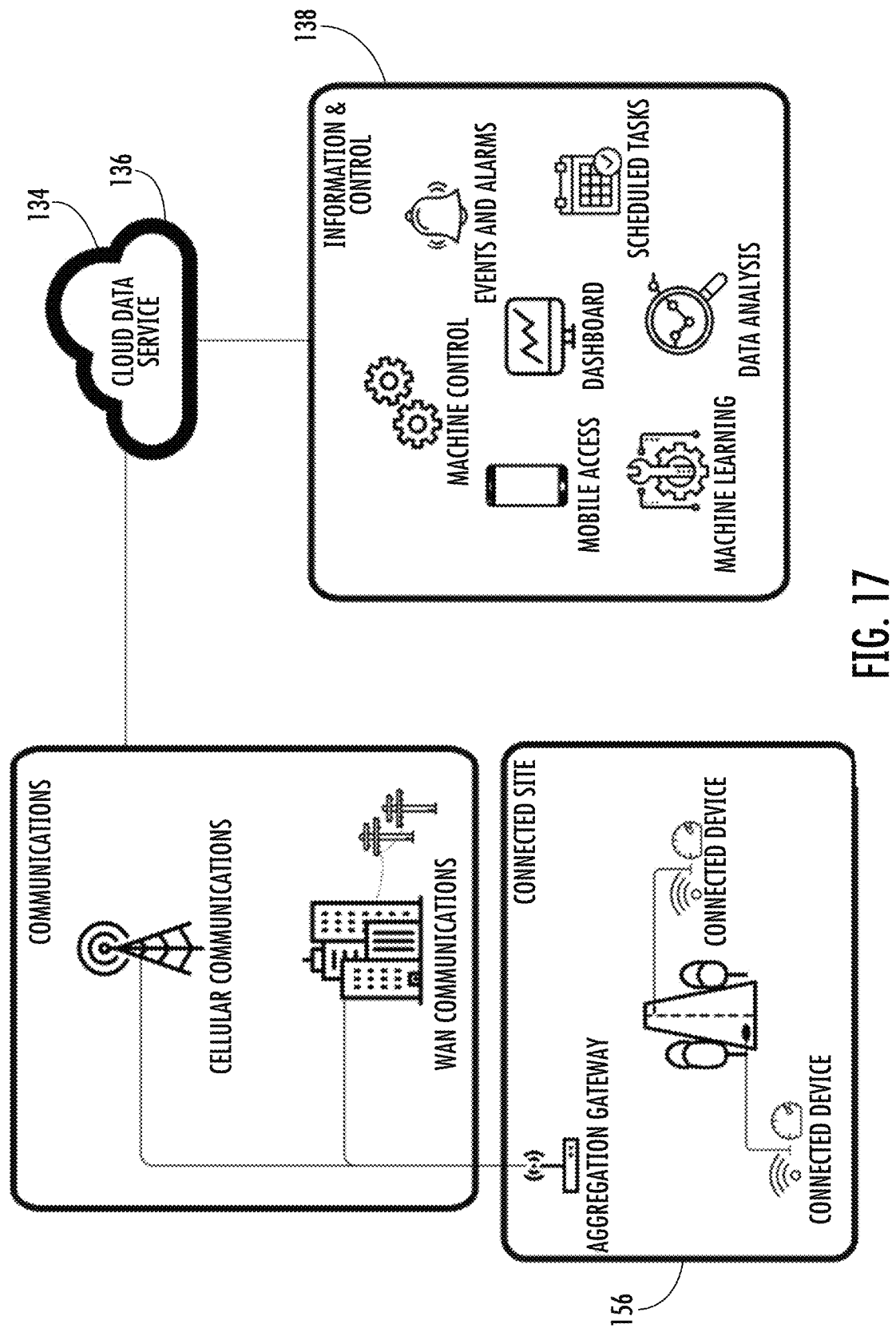
FIG. 17 is a schematic depiction of a wireless (cloud) based asset management platform, according to an exemplary embodiment.
Figure 18:
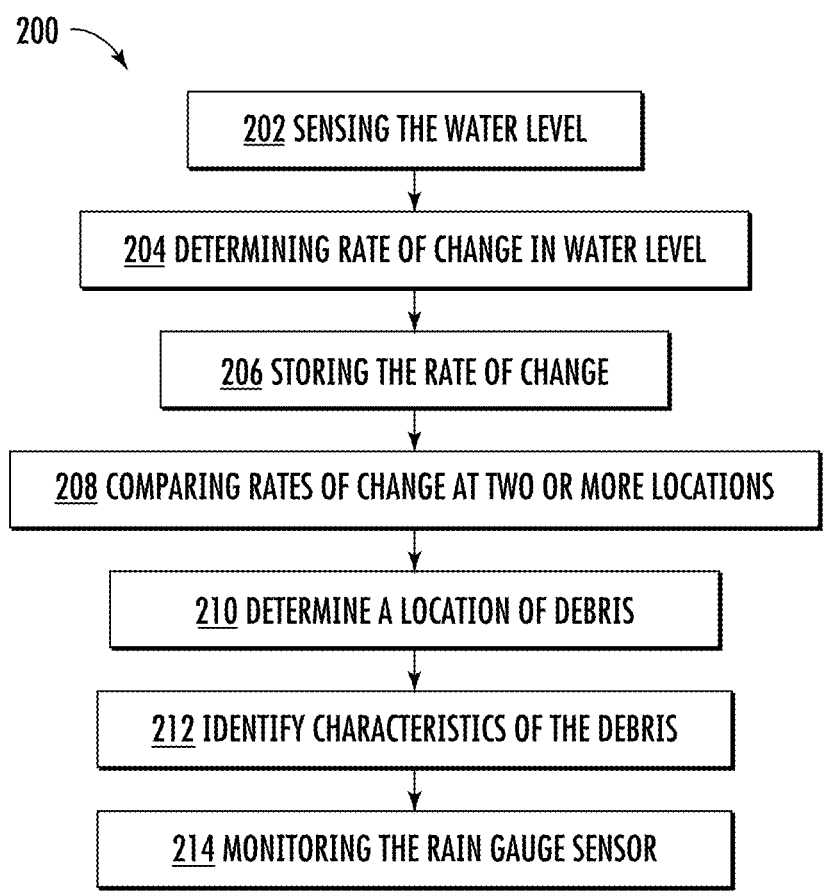
FIG. 18 shows a method for determining debris accumulation at locations on a permeable surface of the type supported above a drainage structure situated below the permeable surface, according to an exemplary embodiment.

FIG. 17 shows several wireless technologies capable of transmitting sensor 108 data 134. All connected devices (e.g., sensors 108, processors 138, electronic memory 136) communicate with an aggregation gateway 156 via low power LoRA communications. The aggregation gateway 156 utilizes wireless (WiFi) communications if pick up is near the site or cellular communications if the site is remote. The sensors 108 and LoRA communications system have very low power draw or usage requirements. Thus, sensors 108 can be powered by Lithium-Ion batteries, e.g., included within the sensor 108 housing or perforated pipe 126. Cellular communications generally use greater power consumption. As such, the aggregation gateway may use alternative power sources (e.g., solar power generation with a marine battery and/or a direct connection to a power supply). In some embodiments, data 134 processor 138 is remotely coupled to sensors 108 via a wireless data 134 link. In some embodiments, the cellular communication system includes a cloud data 134 service (e.g., Telit).

Information and control process may include dashboarding of sensor 108 data 134 and/or have thresholds for scheduled tasks (e.g., permeable pavement surface 112, vacuuming, sensory battery replacement, data 134 collection with a tipping bucket rain gauge 132). Larger installations encompass larger plan area 102 portions of the urban environment to facilitate development of data 134 analytics and predict when/where maintenance is more likely to occur throughout all permeable pavement 104 plan area 102 and/or tributary area 150 installations.

TABLE 1

Potential Clogging Scenarios for Condition 1 for Parking Lot Application 2

| Clogging Area | Sensor(s) with Zero or Slow Accumulation | Sensor(s) with Accumulation Equal to Rainfall Intensity | Sensor(s) with Accumulation Equal To or Exceeding Rainfall Intensity | Clogged Area as Percentage |
| --- | --- | --- | --- | --- |
| Area 1 | Sensor 1 | 3, 6 | 2, 4, 5 | 17 |
| Area 2 | Sensor 2 | n.a. | 1, 3, 4, 5, 6 | 17 |
| Area 3 | Sensor 3 | 1, 4 | 2, 5, 6 | 17 |
| Area 4 | Sensor 4 | 3, 6 | 1, 2, 5 | 17 |
| Area 5 | Sensor 5 | n.a. | 1, 2, 3, 4, 6 | 17 |
| Area 6 | Sensor 6 | 1, 4 | 2, 3, 5 | 17 |
| Areas 1, 2 | Sensors 1, 2 | n.a. | 3, 4, 5, 6 | 34 |
| Areas 2, 3 | Sensors 2, 3 | n.a. | 1, 4, 5, 6 | 34 |
| Areas 4, 5 | Sensors 4, 5 | n.a. | 1, 2, 3, 6 | 34 |
| Areas 5, 6 | Sensors 5, 6 | n.a. | 1, 2, 3, 4 | 34 |
| Areas 1, 4 | Sensors 1, 4 | 2, 5 | 3, 6 | 34 |
| Areas 2, 5 | Sensors 2, 5 | n.a. | 1, 2, 3, 6 | 34 |
| Areas 3, 6 | Sensors 3, 6 | 1, 4 | 2, 5 | 34 |
| Areas 1, 2, 3 | Sensors 1, 2, 3 | n.a. | 4, 5, 6 | 50 |
| Areas 4, 5, 6 | Sensors 4, 5, 6 | n.a. | 1, 2, 3 | 50 |
| Areas 1-6 | Sensors 1-6 | n.a. | n.a. | 100 |

TABLE 2

Potential Clogging Scenarios for Condition 2 for Parking Lot Application 2

| Clogging Area(s) Bounded By | Sensor(s) with Zero or Slow Accumulation | Sensor(s) with Accumulation Equal to Rainfall Intensity | Sensor(s) with Accumulation Equal To or Exceeding Rainfall Intensity | Clogged Area as Percentage |
| --- | --- | --- | --- | --- |
| 1, 2 | n.a. | 3, 4, 5, 6 | 1, 2 | 17 |
| 2, 3 | n.a. | 1, 4, 5, 6 | 2, 3 | 17 |
| 4, 5 | n.a. | 1, 2, 3, 6 | 4, 5 | 17 |
| 5, 6 | n.a. | 1, 2, 3, 4 | 5, 6 | 17 |
| 1, 2, 4, 5 | n.a. | 3, 6 | 1, 2, 4, 5 | 17 |
| 2, 3, 5, 6 | n.a. | 1, 4 | 2, 3, 5, 6 | 17 |

TABLE 3

Potential Clogging Scenarios for Condition 3 for Parking Lot Application 2

| Clogging Area(s) Bounded By | Sensor(s) with Zero or Slow Accumulation | Sensor(s) with Accumulation Equal to Rainfall Intensity | Sensor(s) with Accumulation Equal To or Exceeding Rainfall Intensity | Clogged Area as Percentage |
|---|---|---|---|---|
| 1, 2 | n.a. | 3, 4, 5, 6 | 1, 2 | 8 |
| 2, 3 | n.a. | 1, 4, 5, 6 | 2, 3 | 8 |
| 4, 5 | n.a. | 6, 1, 2, 3 | 4, 5 | 8 |
| 5, 6 | n.a. | 4, 1, 2, 3 | 5, 6 | 8 |
| 1, 2, 3 | n.a. | 4, 5, 6 | 1, 2, 3 | 20 |
| 4, 5, 6 | n.a. | 1, 2, 4 | 4, 5, 6 | 20 |

TABLE 4

Potential Clogging Scenarios for Condition 3 for Parking Lot Application 2

| Clogging Area(s) Bounded By | Sensor(s) with Zero or Slow Accumulation | Sensor(s) with Accumulation Equal to Rainfall Intensity | Sensor(s) with Accumulation Equal to or Exceeding Rainfall Intensity | Clogged Area as Percentage |
|---|---|---|---|---|
| 1, 2, 4, 5 | n.a. | 3, 6 | 1, 2, 4, 5 | 20 |
| 2, 3, 5, 6 | n.a. | 1, 4 | 2, 3, 5, 6 | 20 |
| 1, 2, 3, 4, 5, 6 | n.a. | n.a. | 1, 2, 3, 4, 5, 6 | 30 |
| 1, 2, 3, 4, 5, 6 | 2, 5 | n.a. | 1, 3, 4, 6 | >50 |

TABLE 5

Sensor Tracking of Clogging Scenarios for Parking Lot Application 3

| Clogging Area(s) Bounded By | Sensor(s) with Zero or Slow Accumulation | Sensor(s) with Accumulation Equal to Rainfall Intensity | Sensor(s) with Accumulation Equal to or Exceeding Rainfall Intensity | Clogged Area as Percentage |
|---|---|---|---|---|
| 2 | 1 | 3 | 2 | 33 |
| 1, 3 | 2 | n.a. | 1, 3 | 33 |
| 2 | 3 | 1 | 2 | 33 |
| 1, 2 | n.a. | 3 | 1, 2 | 33 |
| 2, 3 | n.a. | 1 | 2, 3 | 33 |
| 1 | 2, 3 | n.a. | 3 | 66 |
| 3 | 1, 2 | n.a. | 1 | 66 |
| n.a. | 1, 2, 3 | n.a. | n.a. | 100 |

TABLE 6

Sensor Tracking of Clogging Scenarios for Parking Lot Application 4

| Clogging Area(s) Bounded By | Sensor(s) with Zero or Slow Accumulation | Sensor(s) with Accumulation Equal to Rainfall Intensity | Sensor(s) with Accumulation Equal to or Exceeding Rainfall Intensity | Clogged Area as Percentage |
|---|---|---|---|---|
| 2 | 1 | 3, 4, 5, 6 | 2 | 16 |
| 1, 3 | 2 | 4, 5, 6 | 1, 3 | 16 |
| 2 | 3 | 4, 5, 6 | 2 | 16 |
| 5 | 4 | 1, 2, 3 | 5 | 16 |
| 4, 6 | 5 | 1, 2, 3 | 4, 6 | 16 |
| 5 | 6 | 1, 2, 3 | 5 | 16 |

TABLE 6-continued

Sensor Tracking of Clogging Scenarios for Parking Lot Application 4

| Clogging Area(s) Bounded By | Sensor(s) with Zero or Slow Accumulation | Sensor(s) with Accumulation Equal to Rainfall Intensity | Sensor(s) with Accumulation Equal to or Exceeding Rainfall Intensity | Clogged Area as Percentage |
|---|---|---|---|---|
| 1, 2 | n.a. | 3, 4, 5, 6 | 1, 2 | 16 |
| 2, 3 | n.a. | 1, 4, 5, 6 | 2, 3 | 16 |
| 4, 5 | n.a. | 6, 1, 2, 3 | 4, 5 | 16 |
| 5, 6 | n.a. | 4, 1, 2, 3 | 5, 6 | 16 |
| 3 | 1, 2 | 4, 5, 6 | 3 | 33 |
| 1 | 2, 3 | 4, 5, 6 | 1 | 33 |
| 6 | 4, 5 | 1, 2, 3 | 6 | 33 |
| 4 | 5, 6 | 1, 2, 3 | 4 | 33 |
| n.a. | 1, 2, 3 | 4, 5, 6 | n.a. | 50 |
| n.a. | 4, 5, 6 | 1, 2, 3 | n.a. | 50 |
| n.a. | 1, 2, 3, 4, 5, 6 | n.a. | n.a. | 100 |

Some embodiments implement a method 200 for determining debris accumulation on a permeable surface 112 supported above a storage system or drainage structure 114 located underneath the permeable surface 112. Method 200 includes a first step 202 for sensing the water-level 118 at sensors 108 located within the drainage structure 114 at various times (e.g., $t_0$ to $t_n$). For example, sensors 108 are located at predetermined locations $S_1$, $S_2$, $S_3$, etc. within the storage system/drainage structure 114 that are most susceptible to flooding/clogging or otherwise maximize the area of the plan area 102 and/or drainage structure 114 being monitored, e.g., with the least number of sensors 108. A second step 204 involves determining the rate r of the water-level 118 change at each sensor 108 (e.g., representative for a specific location, e.g., $S_1$) relative to the total water level 118 change (e.g., representative of a global change and estimated by the water-level 118 change accumulated at all locations e.g., $S_2$ and $S_3$). In a third step 206, the rate r (e.g., r to $r_n$) of water-level 118 changes is stored by a controller or processor 138 for each location at a particular times (e.g., $t_0$ to $t_n$). In a fourth step 208, the rates r of water-level 118 changes of a first sensor 108 at relative times, e.g., $t_1$ to $t_n$ to determine locations, e.g., $S_1$, $S_2$, and $S_3$ at which the relative rate r of water-level 118 change slows for the first sensor 108 in reference to the relative rate r of water-level 118 change of other sensors 108 (e.g., surrounding first sensor 108). A fifth step 210 involves determining the location, e.g., $S_1$ of debris accumulation based upon the sensor 108 location ($S_1$) at which a rate r of water-level 118 change slows.

In some embodiments, method 200 further includes a sixth step 212 of identifying characteristics of the debris accumulation based upon the sensor 108 location where the rate r of water-level 118 change slows relative to other sensors 108. Method 200 includes a seventh step 214 of monitoring a rain gage sensor 108, e.g., located above the drainage structure 114 in the vicinity of the permeable surface or in another remote location that receives approximately equal rainfall. For example, a remote location may include a local weather station or other WAN connected rainfall measurement. The fifth step 210, involves determining locations (e.g., $S_1$, $S_2$, and/or $S_3$, etc.) at which the relative rate of water-level 118 change slows relative to the water-level 118 change of other sensors 108 at other (e.g., adjacent) locations (e.g., $S_1$, $S_2$, and/or $S_3$, etc.), includes determining rain volume from the rain gage sensor 108.

In some embodiments, the first step 202 of sensing the water-level 118 at sensors 108 located at predetermined locations (e.g., $S_1$, $S_2$, and/or $S_3$, etc.) further includes generating and storing data 134 representative of the water-levels 118 at the predetermined locations (e.g., $S_1$, $S_2$, and/or $S_3$, etc.) in reference to times $t_0$ to $t_n$. For example, a water-level change is considered to have slowed relative to the rate r of water-level 118 change of other sensors 108, if the water-level 118 sensor detects that the rate r has slowed by more than a predetermined amount or threshold. In various embodiments, the predetermined threshold is a rate that has declined more than 5%, 10%, 15%, 20%, 25%, 30%, 35%, 40%, 50%, or more. In some embodiments, the third step 206 involves storing data 134 off site via wireless transmission of the data 134 to a remote system that stores and/or analyzes the data 134.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. System for monitoring water-levels generated by water flowing through an area of a permeable surface into a water drainage structure situated below the permeable surface, the system comprising:
   a permeable surface including pavement, the permeable surface including water flow openings through which water flows into the water drainage structure;
   a first water-level sensor located at a first position in the water drainage structure to generate first water-level data representative of the water-level at the first position, wherein the first water-level sensor is associated with a first location in the permeable surface;
   a second water-level sensor located at a second position in the water drainage structure to generate second water-level data representative of the water-level at the second position, wherein the second water-level sensor is associated with a second location in the permeable surface different than the first location;
   a data memory; and
   a data processor communicatively coupled to the first and second water-level sensors and the memory, the data processor configured to receive first water-level data sampled from the first sensor and second water-level data from the second sensor at a plurality of times $t_0$ to $t_n$, generate a plurality of first water-level change rates $r_1$ to $r_n$ based upon the first water-level data in reference to times $t_1$ to $t_n$, generate a plurality of second water-level change rates $rr_1$ to $rr_n$ based upon the second water-level data in reference to times $t_1$ to $t_n$, compare rates $r_1$ to $r_n$ to changes rates $rr_1$ to $rr_n$ for a select group of times $t_1$ to $t_n$ to generate comparison data $c_1$ to $c_n$ in reference to at least one of the first and second water-level change rates $r$ or $rr$, determine comparison data changes over time in reference to the at least one of the first and second water-level change rates, and determine one or more locations of reduced permeability in the permeable surface based on analyzing the comparison data, wherein the determining the one or more locations of reduced permeability in the permeable surface is based at least in part on the first water-level sensor being located at the first location and the second water-level sensor being located at the second location.

2. The system of claim 1, the data processor further configured to store the first water-level data and the second water-level data in the data memory.

3. The system of claim 1, the data processor further configured to store the first water-level change rates $r_1$ to $r_n$ and the second water-level change rates $rr_1$ to $rr_n$ in the data memory.

4. The system of claim 1, the data processor further configured to store the comparison data $c_1$ to $c_n$ in the data memory.

5. The system of claim 1, the data processor further configured to store the comparison data changes in the data memory.

6. The system of claim 1, wherein the permeable surface includes a plurality of pavement sections spaced to generate water flow openings through which water flows into the water drainage structure.

7. The system of claim 1, wherein the water drainage structure is porous stone fill.

8. The system of claim 1, wherein the data processor determines if one of the first and second water-level change rates is slowing relative to the other of the first and second water-level change rates based upon the comparison data changes.

9. The system of claim 1, wherein the data processor is communicatively coupled to the water-level sensors via a wireless data link.

10. The system of claim 1, wherein the select group includes all of the times $t_1$ to $t_n$.

11. The system of claim 10, wherein $t_n$ is at least 500 samples.

12. A paved system comprising:
   a water drainage structure;
   a rigid permeable surface supported above the drainage structure to permit water to flow from the surface into the structure;
   a plurality of water-level sensors located at respective locations within the drainage structure to generate respective water-level data representative of the water-level at the respective locations, the plurality of water-level sensors including a first water-level sensor associated with a first location, of the respective locations, in the rigid permeable surface and a second water-level sensor associated with a second location, of the respective locations, in the rigid permeable surface different than the first location;
   a memory;
   a data processor communicatively coupled to the first and second water-level sensors and the memory, the data processor receiving first water-level data sampled from the first sensor and second water-level data from the second sensor at a plurality of times $t_0$ to $t_n$, the data processor generating water-level rate change data for each water-level sensor in reference to times $t_1$ to $t_n$, and comparing water-level rate changes from all sensors from time $t_1$ to $t_n$ and identifying the water-level sensors which have relative water-level rate changes which slow relative to the water-level rate changes of the other of the sensors from time $t_1$ to $t_n$, and the data processor determining one or more locations of reduced permeability in the rigid permeable surface based on analyzing the water-level rate change data, wherein the data processor determining the one or more locations of reduced permeability in the rigid permeable surface is based at least in part on the first water-level sensor being located at the first location and the second water-level sensor being located at the second location.

13. The paved system of claim 12, the data processor storing the water-level rate change data for each water-level sensor in reference to times $t_1$ to $t_n$.

14. The paved system of claim 12, the data processor determining the location of the water-level sensors which have water-level rates which slow relative to the water-level rate changes of the other of the sensors.

15. The paved system of claim 12, wherein a water-level change is considered to have slowed for a given sensor relative to the water-level rate change of the other of the sensors if it has slowed by more than a predetermined amount.

16. The paved system of claim 12, wherein the surface is composed of a plurality of pavement sections spaced to produce water flow openings.

17. The paved system of claim 16, wherein the data processor is communicatively coupled to the water-level sensors via a wireless data link.

18. A method for determining debris accumulation at locations on a permeable surface of the type supported above a drainage structure situated below the permeable surface, the method comprising:
   sensing the water-levels at a plurality of predetermined locations within the drainage structure at each of a plurality of times t0 to tn, wherein the water-levels are resultant from water flowing through water flow openings in a permeable pavement surface, wherein the sensing the water-levels is performed at least in part by a plurality of water-level sensors;
   determining the rate of water-level change at each of the locations based upon the water-level change for the respective locations;
   comparing the rates of water-level changes and determining the locations at which the relative rate of water-level change slows in reference to the water-level change of the other sensors; and
   determining a location of reduced permeability in the permeable pavement surface based upon the location at which relative water-level change slows, and further based at least in part on the first water-level sensor being located at the first location and the second water-level sensor being located at the second location.

19. The method of claim 18, wherein the step of sensing includes generating and storing data representative of the water-levels at the plurality of predetermined locations in reference to times t0 to tn.

20. The method of claim 18, wherein the step of sensing the water-levels at the plurality of water-level sensors includes the wireless transmission of data.

* * * * *